(12) United States Patent
Kishima

(10) Patent No.: US 8,922,637 B2
(45) Date of Patent: Dec. 30, 2014

(54) SAMPLE-IMAGE ACQUISITION APPARATUS, SAMPLE-IMAGE ACQUISITION METHOD AND SAMPLE-IMAGE ACQUISITION PROGRAM

(75) Inventor: Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 416 days.

(21) Appl. No.: 13/033,019

(22) Filed: Feb. 23, 2011

(65) Prior Publication Data

US 2011/0216182 A1  Sep. 8, 2011

(30) Foreign Application Priority Data

Mar. 2, 2010  (JP) ................ P2010-045586

(51) Int. Cl.
- *H04N 7/18* (2006.01)
- *G06T 7/00* (2006.01)
- *G06K 9/00* (2006.01)
- *H04N 5/235* (2006.01)
- *G02B 21/36* (2006.01)

(52) U.S. Cl.
CPC ............... *H04N 7/18* (2013.01); *G06T 7/0069* (2013.01); *G06K 9/00127* (2013.01); *H04N 5/2351* (2013.01); *G02B 21/365* (2013.01)
USPC .... 348/79; 250/201.2; 250/201.3; 250/459.1; 348/335; 348/362; 382/106; 382/128; 382/133; 435/287.2

(58) Field of Classification Search
CPC .. G02B 21/367; G02B 21/365; G02B 21/244; H04N 7/18; H04N 13/0221
USPC ............................ 348/79; 382/128; 250/201.3
IPC ........................................................ H04N 7/18
See application file for complete search history.

(56) References Cited

U.S. PATENT DOCUMENTS

| | | | |
|---|---|---|---|
| 5,481,111 A | 1/1996 | Rosar et al. | |
| 6,961,080 B2 | 11/2005 | Richardson | |
| 7,110,105 B2 | 9/2006 | Yoshida et al. | |
| 8,184,920 B2 | 5/2012 | Oshiro et al. | |
| 8,310,531 B2 * | 11/2012 | Nandy | 348/79 |
| 2003/0040031 A1 | 2/2003 | Kim et al. | |
| 2003/0081138 A1 * | 5/2003 | Hofer et al. | 348/362 |
| 2003/0132382 A1 | 7/2003 | Sogard | |
| 2004/0183902 A1 | 9/2004 | Bishop | |
| 2005/0036667 A1 * | 2/2005 | So et al. | 382/128 |
| 2008/0008349 A1 | 1/2008 | Binnig et al. | |
| 2008/0304147 A1 | 12/2008 | Kawanabe et al. | |
| 2009/0238435 A1 * | 9/2009 | Shields | 382/133 |
| 2009/0309963 A1 * | 12/2009 | Ogihara et al. | 348/79 |
| 2010/0321484 A1 | 12/2010 | Kishima | |
| 2011/0317904 A1 | 12/2011 | Zhu et al. | |
| 2012/0312957 A1 * | 12/2012 | Loney et al. | 250/201.3 |
| 2014/0049634 A1 * | 2/2014 | Tafas et al. | 348/79 |

FOREIGN PATENT DOCUMENTS

| | | |
|---|---|---|
| CN | 101930116 | 12/2010 |
| JP | 2003-222801 | 8/2003 |

OTHER PUBLICATIONS

State Intellectual Property Office of the People's Republic of China, Notification of the First Office Action issued in connection with PRC application No. 2011100437221, dated Apr. 3, 2014. (15 pages).

* cited by examiner

*Primary Examiner* — Jay Patel
*Assistant Examiner* — Neil Mikeska
(74) *Attorney, Agent, or Firm* — K&L Gates LLP

(57) ABSTRACT

A sample-image acquisition apparatus includes: an image taking device; a movement control section; and a sample-image acquisition section.

13 Claims, 13 Drawing Sheets

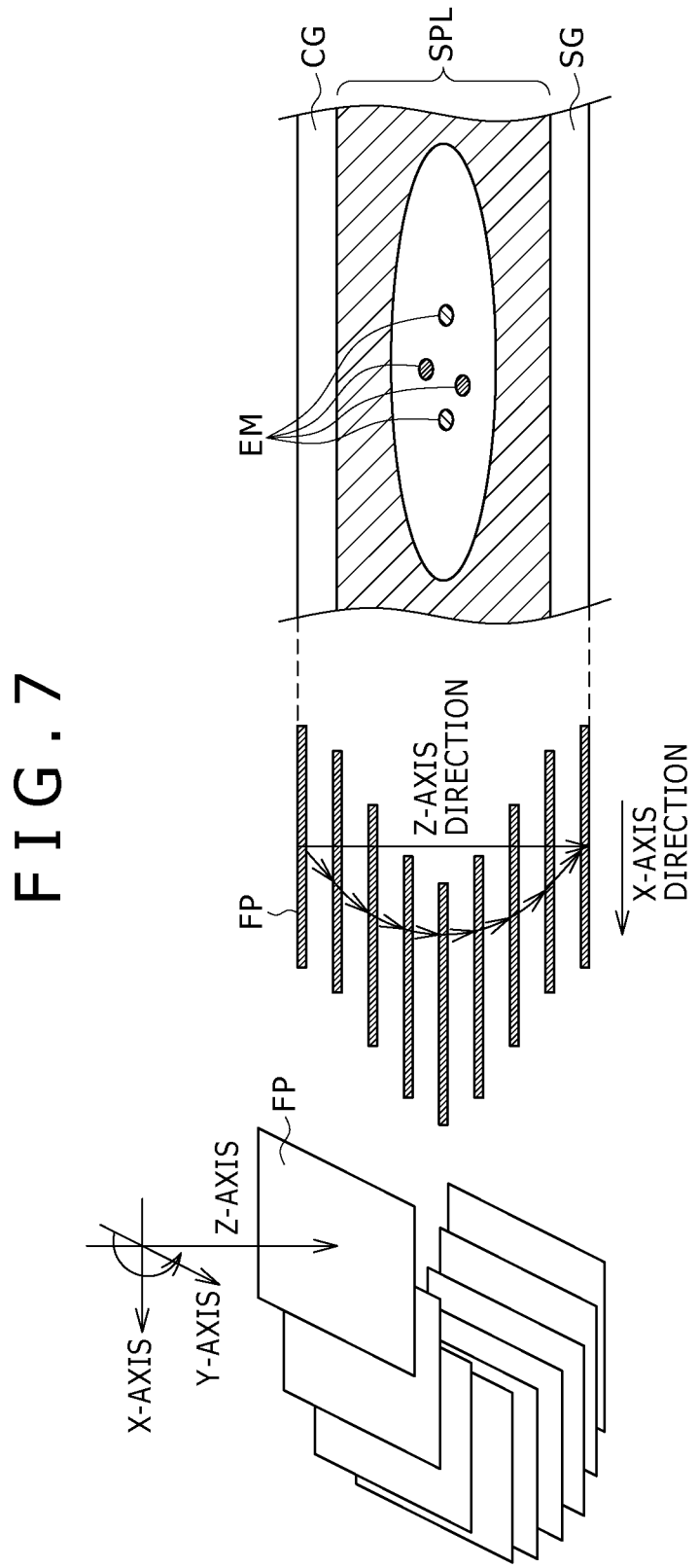

SAMPLE-IMAGE ACQUISITION APPARATUS, SAMPLE-IMAGE ACQUISITION METHOD AND SAMPLE-IMAGE ACQUISITION PROGRAM

CROSS REFERENCES TO RELATED APPLICATIONS

The present application claims priority to Japanese Priority Patent Application JP 2010-045586 filed in the Japan Patent Office on Mar. 2, 2010, the entire content of which is hereby incorporated by reference.

BACKGROUND

In general, the present application relates to a sample-image acquisition apparatus, a sample-image acquisition method and a sample-image acquisition program. For example, the present application can be properly applied to a field in which the image of a biological sample is enlarged and observed.

A biological sample such as a tissue resected segment is fixed on a piece of slide glass and, if necessary, reposited after being stained with a color. In general, when the reposit time becomes long, the resected segment deteriorates and its staining color fades away so that, the tissue resected segment becomes difficult to visually recognize by merely making use of a microscope. In addition, in some cases, a biological sample is diagnosed at a facility other than the institution such as a hospital at which the biological sample has been prepared. If the biological sample is transferred from the institution to the facility by post, in general, a certain period of time is needed to transfer the sample.

Addressing the problems described above, inventors of the present application have proposed an apparatus for repositing a biological sample in the form of image data. For more information on such an apparatus, the reader is advised to refer to documents such as Japanese Patent Laid-open No. 2003-222801.

SUMMARY

By the way, in recent years, the fact that the effects of substances such as a medicinal agent and an inhibitory agent undesirably vary much from case to case has been discovered. The effects vary much because of interactions between specific proteins and between genes. Thus, there has been raised a demand for an accurate measurement of distances between specific proteins and between genes.

In order to meet the demand described above, the inventors of the present application have proposed an apparatus for taking image data as described in Japanese Patent Laid-open No. 2009-148758. The apparatus takes image data as follows. While the focal point of an objective lens is being moved in the thickness direction of a biological sample in which a specific protein or a gene is labeled with a fluorescent marker, a stage is moved in a surface direction perpendicular to the thickness direction. In the meantime, an image taking device is exposed to the biological sample and the image data of the sample is acquired.

At a specific position in the image data acquired by making use of the apparatus described above, the focal point coincides with the fluorescent marker. At such a specific position, the luminance value is largest. In addition, since the apparatus takes an image of a locus according to the movement made in the surface direction, it is possible to detect a position in the direction of the thickness of the fluorescent marker on the basis of the image of the locus.

If two or more different images of loci of fluorescent markers are superposed on each other on the acquired image, however, it is difficult to separate the different images of loci of fluorescent markers from each other. Thus, it is feared that the position of the fluorescent marker cannot be detected accurately.

Addressing the problems described above, the present application provides a sample-image acquisition apparatus having improved detection precision, a sample-image acquisition method for the apparatus and a sample-image acquisition program implementing the method.

In order to solve the problems described above, the present application provides a sample-image acquisition apparatus employing:

an image taking device on which an image of a sample is created after being enlarged by an objective lens;

a movement control section configured to move a relative position, which is movable in a plane direction perpendicular to an optical-axis direction as a position relative between the image of the sample and the image taking device used for creating the image of the sample after being enlarged by the objective lens having a focal point movable within a range including the sample, in the plane direction changed for each position of the focal point in the optical-axis direction while moving the focal point in the optical-axis direction within the range; and a sample-image acquisition section configured to acquire a sample image by exposing the image taking device to the sample while the movement control section is moving the relative position and the focal point.

In addition, the present application also provides a sample-image acquisition method including:

a movement control step of moving a relative position, which is movable in a plane direction perpendicular to an optical-axis direction as a position relative between an image of a sample and an image taking device used for creating the image of the sample after being enlarged by an objective lens having a focal point movable within a range including the sample, in the plane direction changed for each position of the focal point in the optical-axis direction while moving the focal point in the optical-axis direction within the range; and a sample-image acquisition step of acquiring a sample image by exposing the image taking device to the sample while the movement control step is being carried out.

On top of that, the present application also provides a sample-image acquisition program to be executed by a computer to perform:

a movement control step of moving a relative position, which is movable in a plane direction perpendicular to an optical-axis direction as a position relative between an image of a sample and an image taking device used for creating the image of the sample after being enlarged by an objective lens having a focal point movable within a range including the sample, in the plane direction changed for each position of the focal point in the optical-axis direction while moving the focal point in the optical-axis direction within the range; and a sample-image acquisition step of acquiring a sample image by exposing the image taking device to the sample while the movement control step is being carried out.

As described above, for any of the sample images taken by moving the relative position explained above in different plane directions for the same position in the optical-axis direction, the image of a detection object can be taken without superposing the image of the detection object on another image so that, on the basis of the locus of the image of the detection object, the position of the detection object in the optical-axis direction can be computed.

In accordance with the present application described above, it is possible to provide a sample-image acquisition apparatus in which, for any of sample images taken by moving the relative position explained above in different plane directions for the same position in the optical-axis direction, the image of a detection object can be taken without superposing the image of the detection object on another image so that, on the basis of the locus of the image of the detection object, the position of the detection object in the optical-axis direction can be computed so as to raise the detection precision. In addition, it is also possible to provide a sample-image acquisition method to be adopted by the sample-image acquisition apparatus and a sample-image acquisition program implementing the method.

Additional features and advantages are described herein, and will be apparent from the following Detailed Description and the figures.

BRIEF DESCRIPTION OF THE FIGURES

FIG. 7 is a rough diagram showing the movement of a focal-point plane with a movable stage moved in the direction of the Z axis as well as moved along the circumference of a circle over the XY plane;

DETAILED DESCRIPTION

Figure 1:
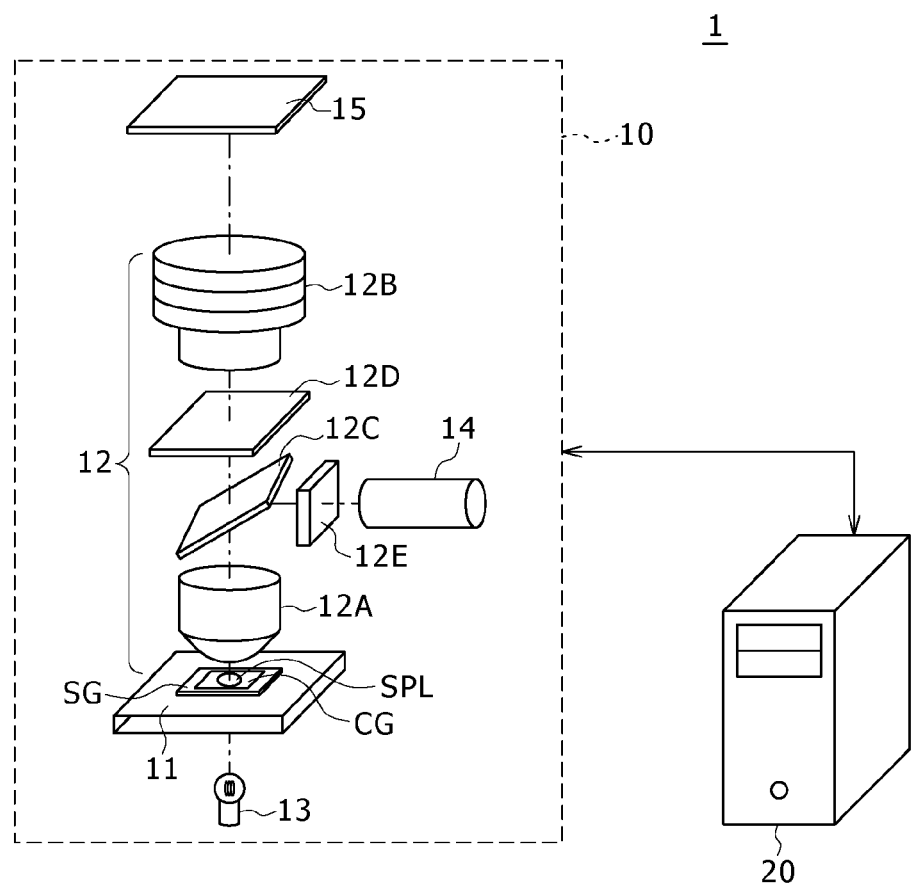
FIG. 1 is a rough diagram showing the configuration of a sample-image acquisition apparatus.

Embodiments of the present application will be described below in detail with reference to the drawings.
1: First Embodiment
2: Other Embodiments 1: First Embodiment 1-1: Configuration of a Biological-Sample Image Acquisition Apparatus FIG. 1 is a rough diagram showing the configuration of a sample-image acquisition apparatus 1 according to a first embodiment. The sample-image acquisition apparatus 1 is configured to employ a microscope 10 and a data processing section 20.

The microscope 10 includes a movable stage 11 having a surface on which a biological sample SPL can be mounted. The biological sample SPL is composed of biological high molecules. Typical examples of the biological sample SPL are a tissue resected segment, cells and a dyeing material. The movable stage 11 can be moved in directions parallel to the surface of the movable stage 11 and a direction perpendicular to the surface. The directions parallel to the surface of the movable stage 11 are referred to as XY-plane directions which are directions parallel to the XY plane. On the other hand, the direction perpendicular to the surface of the movable stage 11 is referred to as the Z-axis direction which is the direction of the Z axis parallel to the optical axis of an objective lens 12A.

Figure 2:
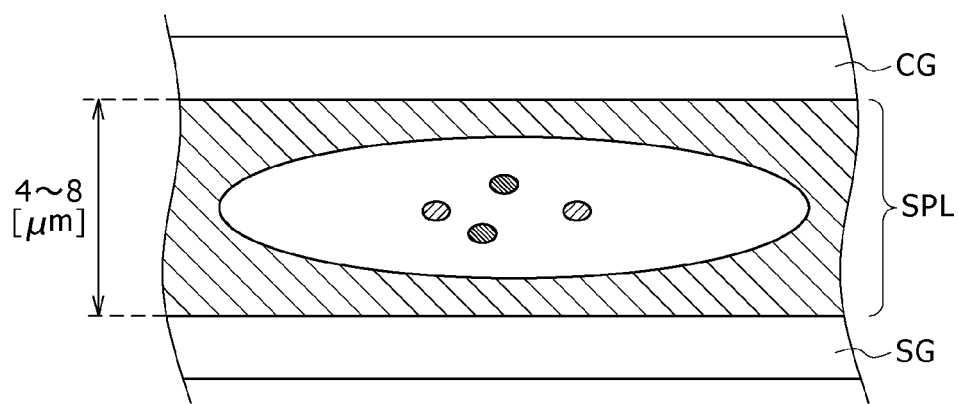
FIG. 2 is a rough diagram showing the thickness-direction cross section of a biological sample.

As shown in FIG. 2, the biological sample SPL has a thickness of about 4 to 8 µm. The thickness is a dimension in the Z-axis direction. The biological sample SPL is fixed in accordance with a fixing technique determined in advance in a state of being sandwiched by a slide glass SG and a cover glass CG. If necessary, the biological sample SPL is stained with a color. The color staining processes include not only ordinary-color staining processes represented by the HE (Hematoxylin Eosin) staining process, the giemsa staining process and the Papanicolaou staining process, but also a fluorescent staining process adopting a method such as the FISH (Fluorescence In-Situ Hybridization) technique or the enzyme antibody technique.

On a specific one of sides of the surface of the movable stage 11, an optical system 12 is positioned. On the other one of the sides of the surface of the movable stage 11, an illumination lamp 13 is positioned. Light generated by the illumination lamp 13 propagates to the biological sample SPL on the specific side of the surface by way of an aperture provided on the movable stage 11, arriving at the biological sample SPL as illumination light.

The illumination light results in a partial image of the biological sample SPL. The partial image is enlarged by the objective lens 12A and an image creation lens 12B, which are employed in the optical system 12, at a magnification power determined in advance. Then, in the microscope 10, an image obtained as a result of the enlargement carried out by the objective lens 12A and the image creation lens 12B is created on the image taking surface of an image taking device 15 including a color filter which is provided on the front surface of the image taking device 15. It is to be noted that, in an operation to acquire an image of a biological sample stained with an ordinary color, the microscope 10 removes a dichroic mirror 12C and an emission filter 12D from the optical path of the optical system 12.

In addition, a light source 14 and an excitement filter 12E are provided at respectively locations determined in advance in the microscope 10. Light radiated by the light source 14 in the microscope 10 includes a component having a wavelength for a fluorescent staining color. When the light source 14 radiates light, the excitement filter 12E passes on only this component, radiating excitement light to the dichroic mirror 12C provided between the objective lens 12A and the image creation lens 12B. The dichroic mirror 12C reflects this excitement light, guiding the reflected excitement light to the objective lens 12A. Then, in the microscope 10, the objective lens 12A converges the excitement light on the biological sample SPL provided on the movable stage 11.

If the biological sample SPL fixed on the slide glass SG has been stained with a fluorescent marker having a fluorescent staining color, the excitement light excites the fluorescent marker to emit light. The fluorescent marker emits the light to the dichroic mirror 12C by way of the objective lens 12A. In the following description, the emitted light is referred to as color producing light. The color producing light passes through the dichroic mirror 12C. Then, the color producing light propagates to the image creation lens 12B by way of the emission filter 12D provided between the dichroic mirror 12C and the image creation lens 12B, reaching the image creation lens 12B.

In the microscope 10, the objective lens 12A enlarges an image based on the color producing light whereas the emission filter 12D absorbs light other than the color producing light. The light other than the color producing light includes light passing through the excitement filter 12E and incident light generated by sources external to the microscope 10. In the following description, the light other than the color producing light is referred to as external light. Then, in the microscope 10, the image creation lens 12B enlarges the image based on the color producing light excluding the external light, projecting the enlarged image on the image taking surface of the image taking device 15.

The data processing section 20 makes use of the image taking device 15 in order to generate an image of the entire biological sample SPL. In the following description, the image of the entire biological sample SPL is referred to as a biological-sample image. The data processing section 20 reposits the biological-sample image as data having a format determined in advance. In the following description, the data having a format determined in advance is referred to as sample data.

As described above, the sample-image acquisition apparatus 1 is capable of repositing the biological sample SPL mounted on the slide glass SG as an image having a microscopic state. Thus, in comparison with a case in which the slide glass SG itself is reposited, the sample-image acquisition apparatus 1 is capable of repositing the biological sample SPL for a long period of time without deteriorating the state in which the biological sample is fixed on the slide glass SG and stained with a fluorescent staining color.

1-2: Configuration of the Data Processing Section

Figure 3:
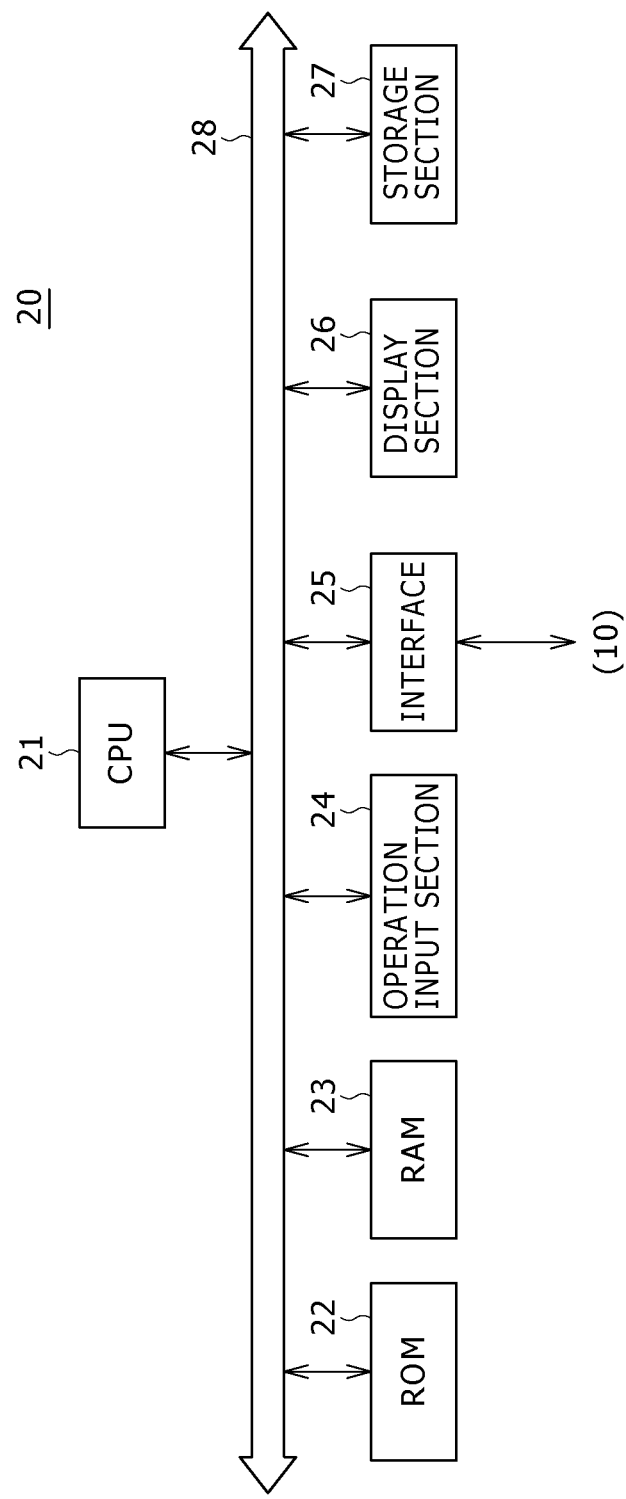
FIG. 3 is a rough block diagram showing the configuration of a data processing apparatus.

Next, the configuration of the data processing section 20 is explained as follows. As shown in FIG. 3, the data processing section 20 is configured to include a CPU (Central Processing Unit) 21 and pieces of hardware. The pieces of hardware are connected to the CPU 21 by a bus 28 to be controlled by the CPU 21.

To put it concretely, the pieces of hardware include a ROM (Read Only Memory) 22, a RAM (Random Access Memory) 23, an operation input section 24, an interface 25, a display section 26 and a storage section 27 which are connected to the CPU 21 and to each other by the bus 28. The RAM 23 serves as a work memory of the CPU 21 whereas the operation input section 24 receives instructions according to operations carried out by the user and supplies the instructions to the CPU 21.

The ROM 22 is used for storing a variety of programs to be executed by the CPU 21 in order to carry out various kinds of processing. The programs include a sample-image acquisition program to be executed by the CPU 21 in order to acquire the image of a biological sample stained with a fluorescent staining color. The interface 25 is connected to the microscope 10 shown in FIG. 1.

The display section 26 may include a liquid-crystal display unit, an EL (Electro Luminescence) display unit or a plasma display unit. The storage section 27 can be a magnetic disc, a semiconductor memory or an optical disc. Typical magnetic discs include an HD (Hard Disc).

The CPU 21 selects one of the programs stored in the ROM 22 in accordance with an instruction received from the operation input section 24 and loads the selected program from the ROM 22 into the RAM 23. Then, the CPU 21 executes the program loaded into the RAM 23 in order to properly control the display section 26 and the storage section 27.

In addition, the CPU 21 also executes a program loaded into the RAM 23 in order to properly control the microscope 10 through the interface 25.

1-3: Sample-Image Acquisition Processing

Figure 4:
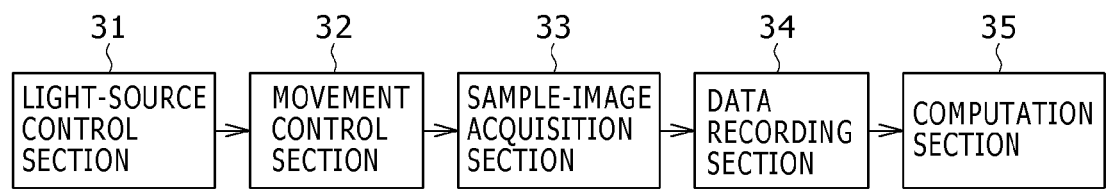
FIG. 4 is a rough block diagram showing the functional configuration of a CPU.

When the CPU 21 receives an instruction to execute the sample-image acquisition program from the operation input section 24, the CPU 21 loads the sample-image acquisition program from the ROM 22 into the RAM 23. Then, the CPU 21 executes the sample-image acquisition program in order to carry out functions of an light-source control section 31, a movement control section 32, a sample-image acquisition section 33, a data recording section 34 and a computation section 35 which are shown in FIG. 4.

The light-source control section 31 drives the light source 14 to emit light and radiate the emitted light to the biological sample SPL.

Figure 5:
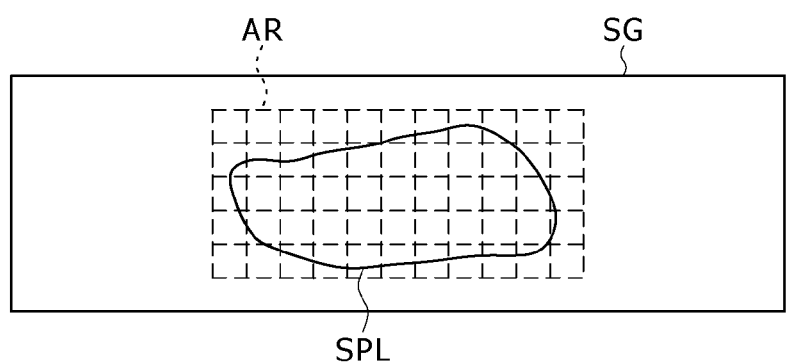
FIG. 5 is a rough diagram showing a biological sample placed in an image taking range.

The movement control section 32 gradually moves the movable stage 11 in order to position a member of the biological sample SPL in an image taking range AR. The member positioned in the image taking range AR is a member to be used as an image taking object. In the following description, the member to be used as an image taking object is referred to as a sample member. For example, the biological sample SPL is placed in the image taking range AR as shown in FIG. 5. In the case shown in FIG. 5, areas included in the biological sample SPL as areas to be positioned in the image taking range AR are not superposed on each other. However, some adjacent areas of the biological sample SPL may also be superposed on each other too.

In a first image taking operation, the movement control section 32 moves the movable stage 11 only in the direction of the Z axis at a constant speed every time the sample member to be used as an image taking object is moved into the image taking range AR. To put it in detail, after the movable stage 11 has been moved to take the sample member to be used as an image taking object into the image taking range AR, the position of the movable stage 11 in the direction of the Z axis is moved in accordance with an equation given below without moving the position (X0, Y0) of the movable stage 11 on the XY plane.

$$Z=Z0+(DZ/T0)T \qquad (1)$$

In Eq. (1), reference notation Z denotes the position of the movable stage 11 in the direction of the Z axis, reference notation Z0 denotes the initial position of the movable stage 11 in the direction of the Z axis, reference notation DZ denotes the total movement distance of the movable stage 11 in the direction of the Z axis, reference notation T0 denotes the total movement time of the movable stage 11 in the direction of the Z axis and reference notation T denotes the movement time of the movable stage 11 in the direction of the Z axis. That is to say, the expression (DZ/T0) is the movement speed in the direction of the Z axis or the movement distance per unit time in the direction of the Z axis. It is to be noted that the initial position Z0 and the total movement distance DZ are set at such values that the focal point of objective lens 12A is moved in the direction of the Z axis within a range which includes at least all the biological sample SPL.

Figure 6A:
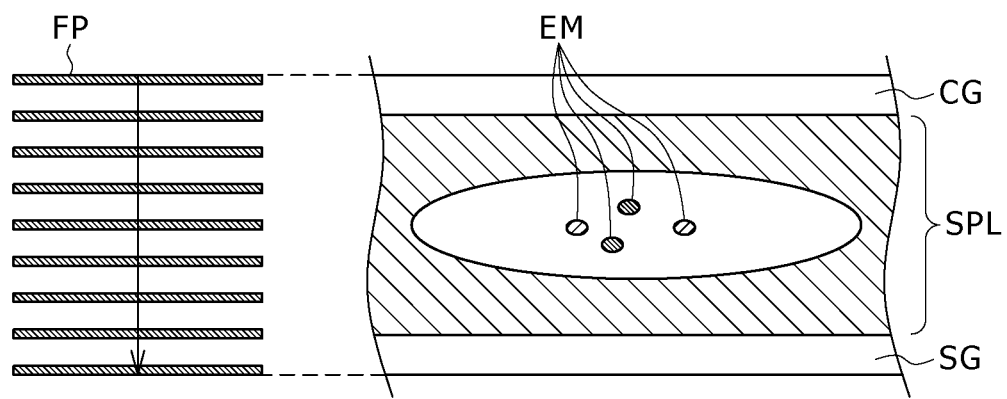
FIGS. 6A to 6C are a plurality of rough diagrams showing the movement of a focal-point plane and a fluorescent image with a movable stage moved only in the direction of the Z axis.

At that time, the focal plane FP of the objective lens 12A is moved at a constant speed in the direction of the Z axis from the cover glass CG of the biological sample SPL to the slide glass SG of the biological sample SPL while the focal plane FP of the objective lens 12A is being fixed on the XY plane as shown in FIG. 6A.

While the movable stage 11 is being moved in the direction of the Z axis, the sample-image acquisition section 33 exposes the image taking device 15 to the biological sample SPL in order to carry out an image taking operation on the biological sample SPL so as to take an image of the sample member. In the following description, an image of the sample member is also referred to as a sample-member image.

Every time the sample member to be used as the image taking object is moved into the image taking range AR, the movement control section 32 and the sample-image acquisition section 33 move the movable stage 11 in the direction of the Z axis and, while the movable stage 11 is being moved in the direction of the Z axis, the movement control section 32 and the sample-image acquisition section 33 expose the image taking device 15 to the sample member in order to take a sample-member image.

The data recording section 34 concatenates sample-member images, which are each taken every time the sample member to be used as the image taking object is moved into the image taking range AR, to each other in order to generate a first biological sample image SIM1.

Figures 6B, 6C:
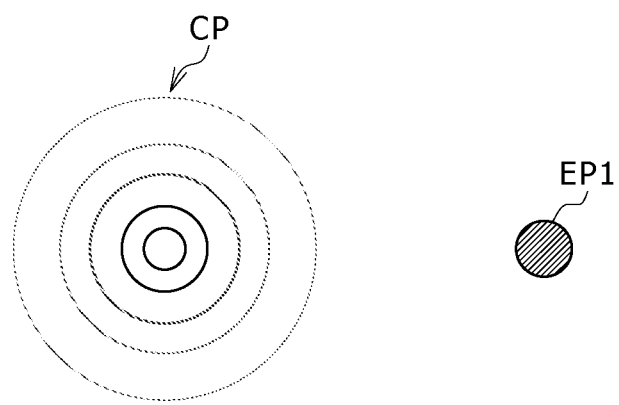

As described above, when the focal point of the objective lens 12A is moved in the direction of the Z axis, as shown in FIG. 6B, an image created on the image taking device 15 as an image CP of a fluorescent marker EM changes from a blurring large state to a clear small state. Later on, the image CP of the fluorescent marker EM changes back to the blurring large state.

Thus, from the first biological sample image SIM1, as shown in FIG. 6C, an image EP1 of the fluorescent marker EM is obtained as an image having the shape all but resembling a circle which is blurring in accordance with a PSF (Point Spread Function). The image EP1 of the fluorescent marker EM is an image extracted as a bunch of pixels (each having a luminance) not smaller than a threshold value determined in advance. In the following description, the image EP1 of a fluorescent marker EM is also referred to as a fluorescent image.

The data recording section 34 generates first sample data including pixel information showing the entire first biological sample image SIM1 or showing a portion included in the first biological sample image SIM1 to serve as a portion which can be used for restoring the first biological sample image SIM1. The data recording section 34 stores the first sample data in the storage section 27.

In a second image taking operation, every time the sample member to be used as an image taking object is moved into the image taking range AR, the movement control section 32 moves the movable stage 11 so as to draw a circular arc at a constant speed over the XY plane while moving the movable stage 11 in the direction of the Z axis.

At that time, the movement control section 32 moves the movable stage 11 along the circumference of a circle having the center point thereof coinciding with a reference position described as follows without changing the orientation. The reference position is the position (X0, Y0) of the XY plane of the movable stage 11 in each image taking range AR during the first image taking operation.

To put it concretely, the movement control section 32 moves the movable stage 11 in the direction of the Z axis so that the position Z of the movable stage 11 satisfies Eq. (2) given as follows.

$$Z=Z0+(DZ/T1)T \qquad (2)$$

While moving the movable stage 11 in the direction of the Z axis as described above, the movement control section 32 also drives the movable stage 11 to make a circular movement over the XY plane in accordance with Eq. (3) given as follows.

$$X=X0+L0 \sin(\omega T), Y=Y0+L0 \cos(\omega T) \qquad (3)$$

In Eq. (2), reference notation Z denotes the position of the movable stage 11 in the direction of the Z axis, reference notation DZ denotes the total movement distance of the movable stage 11 in the direction of the Z axis, reference notation T1 denotes the total movement time of the movable stage 11 in the direction of the Z axis and reference notation T denotes the movement time of the movable stage 11 in the direction of the Z axis. That is to say, the expression (DZ/T1) is the movement speed in the direction of the Z axis or the movement distance per unit time in the direction of the Z axis.

In addition, in Eq. (3), reference notation X denotes the position of the movable stage 11 in the direction of the X axis, reference notation Y denotes the position of the movable stage 11 in the direction of the Y axis, reference notation L0 denotes the radius of the circular movement, reference notation ω denotes the angular speed, reference notation X0 denotes the X coordinate of the center point of the circular movement and reference notation Y0 denotes the Y coordinate of the center point of the circular movement.

It is to be noted that the initial position Z0, the total movement distance DZ, the total movement time T1, the center-point coordinates (X0, Y0), the radius L0 and the angular speed ω are properly set. For example, if the movement speed (DZ/T0) and the movement speed (DZ/T1) are set at the same value, the fluorescent image on the first biological sample image SIM1 acquired in the first image taking operation is too bright so that the position of the center point of the circular arc to be described later cannot be detected accurately in some cases. As explained before, the first image taking operation is an operation to move the movable stage 11 in only the direction of the Z axis. Thus, in order to solve this problem, the movement speed (DZ/T0) is typically made higher than the movement speed (DZ/T1). That is to say, the movement speed (DZ/T0) and the movement speed (DZ/T1) are set at such values that proper biological sample images are acquired in both the first image taking operation and the second image taking operation respectively.

At that time, as shown in FIG. 7, while the focal-point plane FP of the objective lens 12A is being moved within a range including the biological sample SPL in the direction of the Z axis from the cover glass CG to the slide glass SG at a constant speed, the focal-point plane FP is also moved over the XY plane so as to draw a circular arc.

While the movable stage 11 is being moved as described above, the sample-image acquisition section 33 exposes the image taking device 15 to the sample member in order to project an image of the sample member on the image taking device 15 in an operation to acquire a sample-member image.

Every time the sample member to be used as the image taking object is moved into the image taking range AR, the movement control section 32 and the sample-image acquisition section 33 move the movable stage 11 in the direction of the Z axis as well as over the XY plane and, while the movable stage 11 is being moved in this way, the movement control section 32 and the sample-image acquisition section 33 expose the image taking device 15 to the sample member in order to take a sample-member image.

The data recording section 34 concatenates sample-member images, which are each taken every time the sample member to be used as the image taking object is moved into the image taking range AR, to each other in order to generate a second biological sample image SIM2.

Figure 8A:
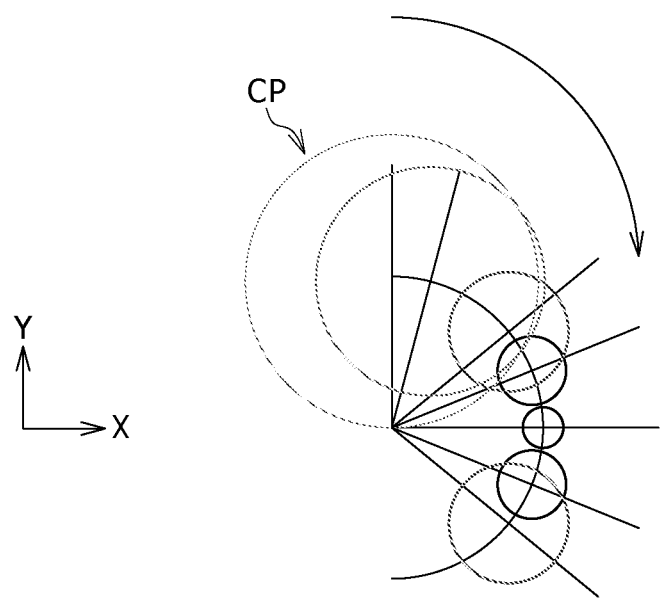
FIGS. 8A and 8B are a plurality of rough diagrams showing, among others, a fluorescent image with a movable stage moved in the direction of the Z axis as well as moved along the circumference of a circle over the XY plane.

As described above, when the focal point of the objective lens 12A is moved in the direction of the Z axis as well as moved over the XY plane to draw a circle, as shown in FIG. 8A, an image created on the image taking device 15 as an image CP of a fluorescent marker EM changes from a blurring large state to a clear small state along a circular locus. Later on, the image CP of the fluorescent marker EM changes back to the blurring large state.

Figure 8B:
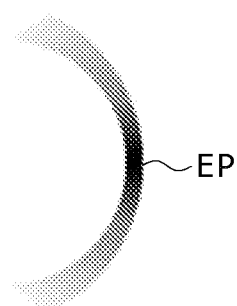

Thus, on the second biological sample image SIM2, as shown in FIG. 8B, in a fluorescent image EP2, the luminance value of an image portion at a position at which the focus point coincides with the fluorescent marker EM is largest. This image portion at this position is obtained as a portion having a shape approximately resembling a thin circular arc.

After the second biological sample image SIM2 has been created, the data recording section 34 generates second sample data including pixel information showing the entire second biological sample image SIM2 or showing a portion included in the second biological sample image SIM2 to serve as a portion which can be used for restoring the second biological sample image SIM2. The data recording section 34 stores the second sample data in the storage section 27 by associating the second sample data with the first sample data.

In a third image taking operation, every time the sample member to be used as an image taking object is moved into the image taking range AR, the movement control section 32 moves the movable stage 11 so as to draw a circular arc at a constant speed over the XY plane while moving the movable stage 11 in the direction of the Z axis (that is, the direction of the optical axis). However, the phase of the start point of the third image taking operation is different from the phase of the start point of the second image taking operation by 90 degrees as will be explained later.

To put it concretely, the movement control section 32 moves the movable stage 11 in the direction of the Z axis so that the position Z of the movable stage 11 satisfies Eq. (2) given before. While moving the movable stage 11 in the direction of the Z axis as described above, the movement control section 32 also moves the movable stage 11 over the XY plane in accordance with Eqs. (4) given as follows.

$$X=X0+L0\sin(\omega T+90°),$$

$$Y=Y0+L0\cos(\omega T+90°) \quad (4)$$

Thus, in the third image taking operation, the movement control section 32 moves the movable stage 11 over the XY plane with the same center point (X0, Y0) of the circular movement as the center point (X0, Y0) of the circular movement in the second image taking operation but with a start point having a phase (representing the start and end positions) advanced by 90 degrees from the start point of the circular movement in the second image taking operation.

While the movable stage 11 is being moved as described above, the sample-image acquisition section 33 exposes the image taking device 15 to the sample member in order to project an image of the sample member on the image taking device 15 in an operation to acquire a sample-member image.

Every time the sample member to be used as the image taking object is moved into the image taking range AR, the movement control section 32 and the sample-image acquisition section 33 move the movable stage 11 in the direction of the Z axis as well as over the XY plane and, while the movable stage 11 is being moved in this way, the movement control section 32 and the sample-image acquisition section 33 expose the image taking device 15 to the sample member in order to take a sample-member image.

The data recording section 34 concatenates sample-member images, which are each taken every time the sample member to be used as the image taking object is moved into the image taking range AR, to each other in order to generate a third biological sample image SIM3.

After the third biological sample image SIM3 has been created, the data recording section 34 generates third sample data including pixel information showing the entire third biological sample image SIM3 or showing a portion included in the third biological sample image SIM3 to serve as a portion which can be used for restoring the third biological sample image SIM3. The data recording section 34 stores the third sample data in the storage section 27 by associating the third sample data with the first sample data and the second sample data.

By the way, each of the first sample data, the second sample data and the third sample data includes additional data showing information used for identifying the biological sample SPL which serves as the image taking object. The information used for identifying the biological sample SPL typically includes the name of a person who picks the biological sample SPL, the gender of the person, the age of the person and a date on which the person who picks the biological sample SPL. The data recording section 34 notifies the person that the person should enter the information to be used for identifying the biological sample SPL to the data processing section 20 at a predetermined timing such as the timing to provide the data processing section 20 with an instruction to reposit data of the biological sample SPL or the timing to set the slide glass SG.

Figure 9A:
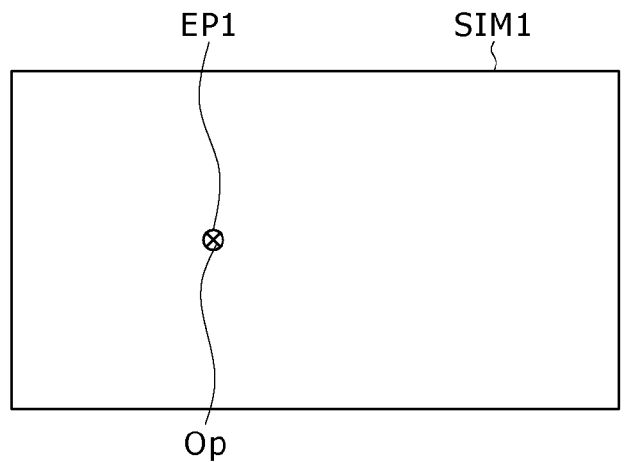
FIGS. 9A to 9C are a plurality of rough diagrams showing a first biological-sample image, a second biological-sample image and a third biological-sample image which are obtained as a result of image taking operations carried out on the same fluorescent marker.
Figure 9B:
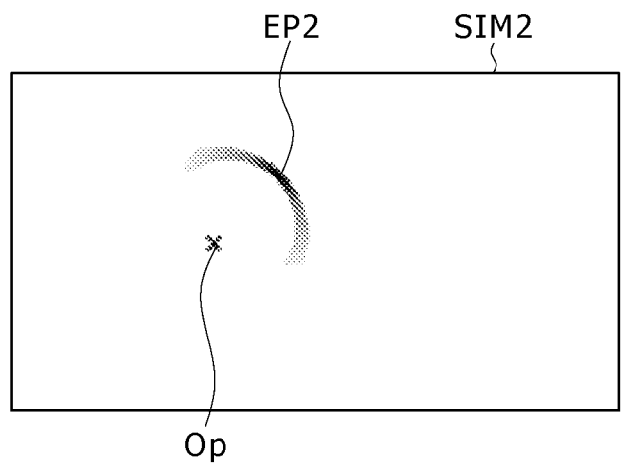
Figure 9C:
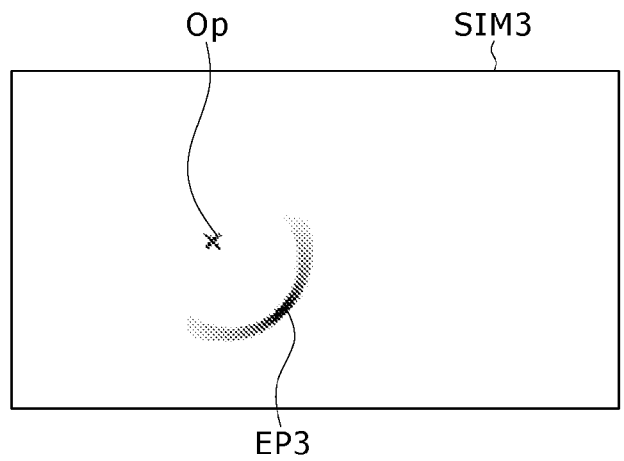

By the way, a first biological sample image SIM1, a second biological sample image SIM2 and a third biological sample image SIM3 which are as shown in FIGS. 9A to 9C have been obtained as a result of image taking operations carried out on the same biological sample SPL having a fluorescent marker EM. A fluorescent image EP1 on the first biological sample image SIM1 is obtained as an image having an approximately circular shape whereas each of a fluorescent image EP2 on the second biological sample image SIM2 and a fluorescent image EP3 on the third biological sample image SIM3 is obtained as an image having a shape approximately resembling a circular arc.

In addition, in the second and third image taking operations carried out to acquire the second biological sample image SIM2 and the third biological sample image SIM3 respectively, the movable stage 11 is moved along the circumference of a circle around the circle center point coinciding with the position at which the first biological sample image SIM1 is placed on the XY plane during the first image taking operation carried out to acquire the first biological sample image SIM1. Thus, the center point of the fluorescent image EP2 on the second biological sample image SIM2 and the center point of the fluorescent image EP3 on the third biological sample image SIM3 coincide with the center point of the fluorescent image EP1 on the first biological sample image SIM1. In FIGS. 9A to 9C, each of the center point of the fluorescent image EP2 on the second biological sample image SIM2 and the center point of the fluorescent image EP3 is shown as the center position (or the center point) Op of a circular arc whereas the center point of the fluorescent image EP1 on the first biological sample image SIM1 is shown as the center position Op (or the center point) of a circle.

Figure 10A:
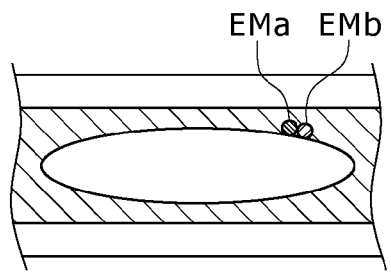
FIGS. 10A to 10D are a plurality of rough diagrams showing a first biological-sample image, a second biological-sample image and a third biological-sample image which are obtained as a result of image taking operations carried out on fluorescent markers close to each other in the directions of the XY plane and the Z axis.
Figure 10B:
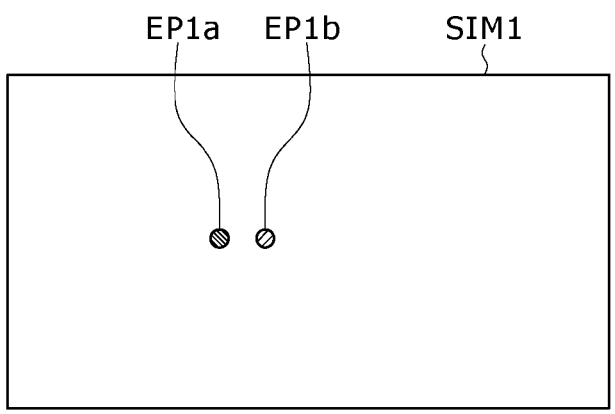
Figure 10C:
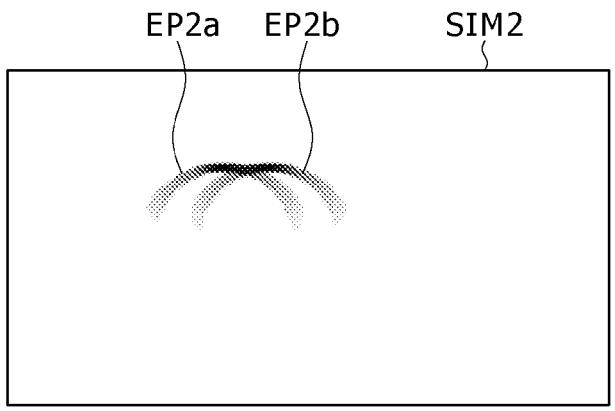
Figure 10D:
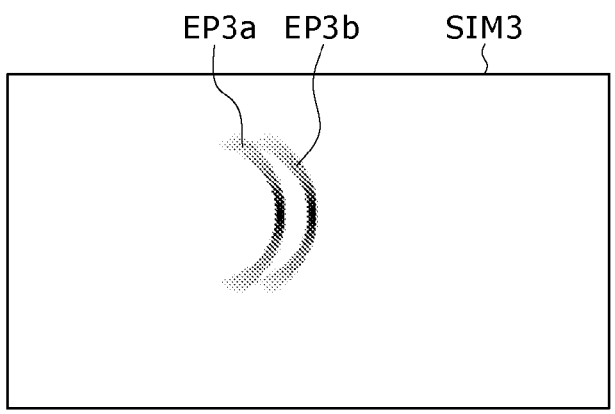

In addition, when an image taking operation is carried out to take images of fluorescent markers EMa and EMb located at positions adjacent to each other in a direction parallel to the XY plane and adjacent to each other in the direction of the Z axis as shown in FIG. 10A, a first biological sample image SIM1 shown in FIG. 10B, a second biological sample image SIM2 shown in FIG. 10C and a third biological sample image SIM3 shown in FIG. 10D are acquired.

The second biological sample image SIM2 includes a fluorescent image EP2a of the fluorescent maker EMa and a fluorescent image EP2b of the fluorescent maker EMb whereas the third biological sample image SIM3 includes a fluorescent image EP3a of the fluorescent maker EMa and a fluorescent image EP3b of the fluorescent maker EMb. In this case, the fluorescent image EP2a and the fluorescent image EP2b may probably be superposed on each other or the fluorescent image EP3a and the fluorescent image EP3b may probably be superposed on each other. In the case shown in FIGS. 10A to 10D, the fluorescent image EP2a and the fluorescent image EP2b are superposed on each other in the second biological sample image SIM2.

If the fluorescent maker EMa emits light having a wavelength different from the wavelength of light emitted by the fluorescent maker EMb in the case described above, that is, if the fluorescent maker EMa emits light having a color different from the color of light emitted by the fluorescent maker EMb in such a case, image processing can be carried out as processing to extract color components of the emitted light in order to separate the fluorescent image EP2a and the fluorescent image EP2b from the second biological sample image SIM2.

If the fluorescent maker EMa emits light having a wavelength equal or close to the wavelength of light emitted by the fluorescent maker EMb, however, the fluorescent image EP2a and the fluorescent image EP2b cannot be separated from each other.

In the sample-image acquisition apparatus 1, however, the second biological sample image SIM2 and the third biological sample image SIM3 are taken in the second and third image taking operations respectively by setting a phase difference of 90 degrees on the XY plane between the start points of the operations. Thus, even if the fluorescent image EP2a and the fluorescent image EP2b are superposed on each other in the second biological sample image SIM2, the fluorescent image EP3a and the fluorescent image EP3b are not superposed on each other in the third biological sample image SIM3. A blurring portion of the fluorescent image EP3a and a blurring portion of the fluorescent image EP3b may be superposed on each other in some cases. In such cases, however, only portions each having luminance values not smaller than a threshold value determined in advance are extracted in order to prevent the fluorescent image EP3a and the fluorescent image EP3b from being superposed on each other.

Taking the factual points described above into consideration, the computation section 35 thus computes the 3-dimensional position of the fluorescent marker EM labeled on a protein (or a gene or the like) of the biological sample SPL on the basis of the acquired first biological sample image SIM1, the acquired second biological sample image SIM2 and the acquired third biological sample image SIM3.

To put it concretely, the computation section 35 reads out the first sample data for the first biological sample image SIM1 from the storage section 27 and extracts a bunch of pixels (each having a luminance) not smaller than a threshold value determined in advance from the first biological sample image SIM1 to be used as the fluorescent image EP1. Then, the computation section 35 computes the value of the point spread function for the fluorescent image EP1. Subsequently, the computation section 35 makes the fluorescent image EP1 sharp by making use of a point spread inverse function which is the inverse function of the point spread function, the value of which has been computed.

Then, the computation section 35 computes the center position Op of the fluorescent image EP1 which has been made sharp. The center position Op can be regarded as the coordinates of the center point of the fluorescent image EP1. Subsequently, the computation section 35 computes a position (x, y) on the XY plane on the basis of a positional relation between the computed center position Op and the position (X0, Y0) of the movable stage 11 on the XY plane. The position (x, y) is the position of the fluorescent marker EM, which is associated with the fluorescent image EP1, on the XY plane.

In addition, the computation section 35 also reads out typically the second sample data for the second biological sample image SIM2 from the storage section 27 and detects the fluorescent image EP2 corresponding to the detected fluorescent image EP1 from the second biological sample image SIM2. The fluorescent image EP2 is also an image of the same fluorescent marker EM as the fluorescent image EP 1.

To put it concretely, the computation section 35 also reads out typically the second sample data for the second biological sample image SIM2 from the storage section 27 and extracts a bunch of pixels each having a luminance not smaller than a threshold value determined in advance from the second biological sample image SIM2 to be used as the fluorescent image EP2.

In the operation carried out by the computation section 35 to extract the fluorescent image EP2 from the second biological sample image SIM2, the computation section 35 takes a position coinciding with the center position Op of the fluorescent image EP1 on the first biological sample image SIM1 as a reference. Thus, the coordinates of the reference are equal to the coordinates of the center position Op. In addition, the fluorescent image EP2 extracted by the computation section 35 from the second biological sample image SIM2 is an image which exists in a range defined by the radius L0 of the movement of the movable stage 11 and the center position Op of the fluorescent image EP2 is located at the center point of the circular arc of the movement.

Thus, when the focal point of the objective lens 12A coincides with the fluorescent marker EM, the luminance value of the fluorescent image EP2 is highest among luminance values on the second biological sample image SIM2. Accordingly, if two or more peaks of luminance values exist on the fluorescent image EP2, images of as many fluorescent makers EM as the peaks of luminance values are determined to be superposed on each other.

If only one peak of luminance values exists on the fluorescent image EP2, conversely, the fluorescent image EP2 is determined to be the image of one fluorescent marker EM. In this case, the gradient of a circular arc created by a bunch of pixels each having a luminance not smaller than a predetermined threshold value on the fluorescent image EP2 shows the direction of the circular movement which is made by the movable stage 11 on the XY plane when the focal point of the objective lens 12A coincides with the fluorescent marker EM.

If only one peak of luminance values is determined to exist in the extracted fluorescent image EP2, the computation section 35 sets a position having coordinates equal to the coordinates of the center position Op of the fluorescent image EP1 corresponding to the fluorescent image EP2 as the center position Op of the circular arc of the fluorescent image EP2.

Figure 11:
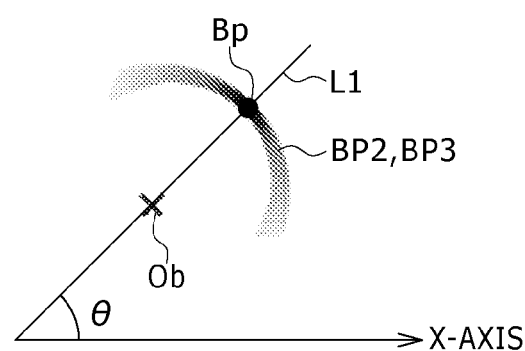
FIG. 11 is a rough diagram to be referred to in description of computation of a circular-arc gradient angle.

The computation section 35 finds the coordinates of a position Bp which has the largest luminance value in the extracted fluorescent image EP2 as shown in FIG. 11. Then, the computation section 35 computes an angle formed by a straight line L1 in conjunction with the X axis, taking the angle as a circular-arc gradient angle θ. The straight line L1 is a straight line connecting the found position Bp to the set center position Op of the circular arc of the fluorescent image EP2.

When the movable stage 11 is moving over the XY plane at an angular speed ω and also moving in the direction of the Z axis at a speed of (DZ/T1), the movement distance of the focal-point plane FP per unit angle is (DZ/T1)/ω).

Then, the computation section 35 computes a position (z) of the fluorescent marker EM for the fluorescent image EP2 by multiplying the computed circular-arc gradient angle θ by ((DZ/T1)/ω). The position (z) is a position in the direction of the Z axis with the initial position Z0 taken as the reference.

In this way, the computation section 35 computes the 3-dimensional position (x, y, z) of the fluorescent marker EM associated with the fluorescent image EP2 for every fluorescent image EP2 extracted from the second biological sample image SIM2 as a fluorescent image EP2 which has only one peak of luminance values.

If the fluorescent image EP2 extracted from the second biological sample image SIM2 has two or more peaks of luminance values, on the other hand, the computation section 35 makes use of the third biological sample image SIM3 in order to find the 3-dimensional position (x, y, z) of the fluorescent marker EM associated with the fluorescent image EP3 extracted from the third biological sample image SIM3 as follows.

The computation section 35 reads out the third biological sample image SIM3 associated with the second biological sample image SIM2 from the storage section 27.

The computation section 35 extracts a bunch of pixels each having a luminance not smaller than a threshold value determined in advance from the third biological sample image SIM3 read out from the storage section 27 and makes use of the bunch of pixels as the fluorescent image EP3.

In the operation carried out by the computation section 35 to extract the fluorescent image EP3 from the third biological sample image SIM3, the computation section 35 takes a position coinciding with the center position Op of the fluorescent image EP1 on the first biological sample image SIM1 as a reference. Thus, the coordinates of the reference are equal to the coordinates of the center position Op. The fluorescent image EP1 is a fluorescent image corresponding to the fluorescent image EP2 which is included in the second biological sample image SIM2 as a fluorescent image determined to have two or more peaks of luminance values. In addition, the fluorescent image EP3 extracted by the computation section 35 from the third biological sample image SIM3 is an image which exists in a range defined by the radius L0 of the movement of the movable stage 11 and is located at the center point of the circular arc of the movement.

If only one peak of luminance values is determined to exist in the extracted fluorescent image EP3, the computation section 35 sets a position having coordinates equal to the coordinates of the center position Op of the fluorescent image EP1 corresponding to the fluorescent image EP2 as the center position Op of the circular arc of the extracted fluorescent image EP3.

The computation section 35 finds the coordinates of a position Bp which has the largest luminance value in the extracted fluorescent image EP3. Then, the computation section 35 computes an angle obtained by as a result of subtracting 90 degrees from an angle formed by a straight line L1 in conjunction with the X axis, taking the computed angle as a circular-arc gradient angle θ. As explained before, the straight line L1 is a straight line connecting the found position Bp to the set center position Op of the circular arc of the fluorescent image EP2.

Then, the computation section 35 computes a position (z) of the fluorescent marker EM by multiplying the computed circular-arc gradient angle θ by ((DZ/T1)/ω). The position (z) is a position in the direction of the Z axis with the initial position Z0 taken as the reference.

In this way, the computation section 35 computes the 3-dimensional position (x, y, z) of the fluorescent marker EM associated with the fluorescent image EP3 for every fluorescent image EP3 extracted from the third biological sample image SIM3 as a fluorescent image EP3 which has only one peak of luminance values.

By the way, if two or more fluorescent markers EM are located at positions all but coinciding with each other on the XY plane but separated from each other in the direction of the Z axis, a continuous image of the two or more fluorescent markers EM may be obtained on each of the second biological sample image SIM2 and the third biological sample image SIM3 in some cases. In such cases, on the basis of the fluorescent image EP1 in the first biological sample image SIM1, the 3-dimensional position of the fluorescent marker EM associated with the fluorescent image EP1 cannot be found even if the second biological sample image SIM2 and the third biological sample image SIM3 are used.

Thus, if each of the fluorescent image EP2 extracted from the second biological sample image SIM2 as a fluorescent image corresponding to the fluorescent image EP1 and the fluorescent image EP3 extracted from the third biological sample image SIM3 as a fluorescent image corresponding to the fluorescent image EP1 includes two or more peaks of luminance values, the computation section 35 determines that two or more fluorescent markers EM are located at positions all but coinciding with each other on the XY plane but separated from each other in the direction of the Z axis.

In this case, the computation section 35 extracts the fluorescent image EP2 corresponding to the fluorescent image EP1 from the second biological sample image SIM2 or the fluorescent image EP3 corresponding to the fluorescent image EP1 from the third biological sample image SIM3. It is to be noted that, in the case of this embodiment, the computation section 35 selects the fluorescent image EP2.

If two or more fluorescent markers EM emit light having colors different from each other, the computation section 35 is capable of separating each of the fluorescent images into fluorescent-image components for their respective color components. Thus, for example, the computation section 35 is capable of separating the fluorescent image EP2 extracted from the second biological sample image SIM2 into fluorescent-image components for red, blue and green color components.

Then, the computation section 35 also examines the number of luminance-value peaks on each of the fluorescent-image components separated from the fluorescent image EP2 for their respective color components. If only one peak of luminance values exists on each of the fluorescent-image components separated from the fluorescent image EP2 for their respective color components, the computation section 35 makes use of the fluorescent image EP2 for each of the fluorescent-image components separated from the fluorescent image EP2 for their respective color components in order to compute the 3-dimensional position of the fluorescent marker EM in the same way as the method described above. In this way, the computation section 35 computes the 3-dimensional position of each of as many fluorescent makers EM as the peaks of luminance values.

If the computation section 35 detects a plurality of luminance-value peaks on each of the fluorescent-image components separated from the fluorescent image EP2 for their respective color components, on the other hand, the computation section 35 determines that images of fluorescent makers EM emitting light having colors close to each other are superposed on each other.

In this case, the computation section 35 sets the coordinates of the center position Op of circular arc of the fluorescent image EP2 at the same values as the coordinates of the center position Op of the circular arc of the fluorescent image EP1 which corresponds to the fluorescent image EP2.

Then, the computation section 35 finds the coordinates of a position Bp which has the largest luminance value in the extracted fluorescent image EP2 for every peak of luminance values. Subsequently, for every position Bp, the computation section 35 computes an angle formed by a straight line L1 in conjunction with the X axis, taking the angle as a circular-arc gradient angle θ. As described before, the straight line L1 is a straight line connecting the found position Bp to the set center position Op of the circular arc of the fluorescent image EP2.

Then, the computation section 35 computes a position (z) of the fluorescent marker EM for the fluorescent image EP2 by multiplying the computed circular-arc gradient angle θ by $((DZ/T1)/\omega)$. The position (z) is a position in the direction of the Z axis with the initial position Z0 taken as the reference.

If a plurality of luminance-value peaks exist on both the fluorescent image EP2 corresponding to the fluorescent image EP1 and the fluorescent image EP3 corresponding to the fluorescent image EP1 as described above, the 3-dimensional position (x, y, z) of each of a plurality of fluorescent makers EM is computed.

The data recording section 34 stores the computed 3-dimensional positions (x, y, z) of fluorescent makers EM in the storage section 27 by associating each of the computed 3-dimensional positions (x, y, z) with the fluorescent image EP1 extracted from the first biological sample image SIM1 as a fluorescent image EP1 corresponding to the fluorescent maker EM.

1-4: Sample-Image Taking Processing

Figure 12:
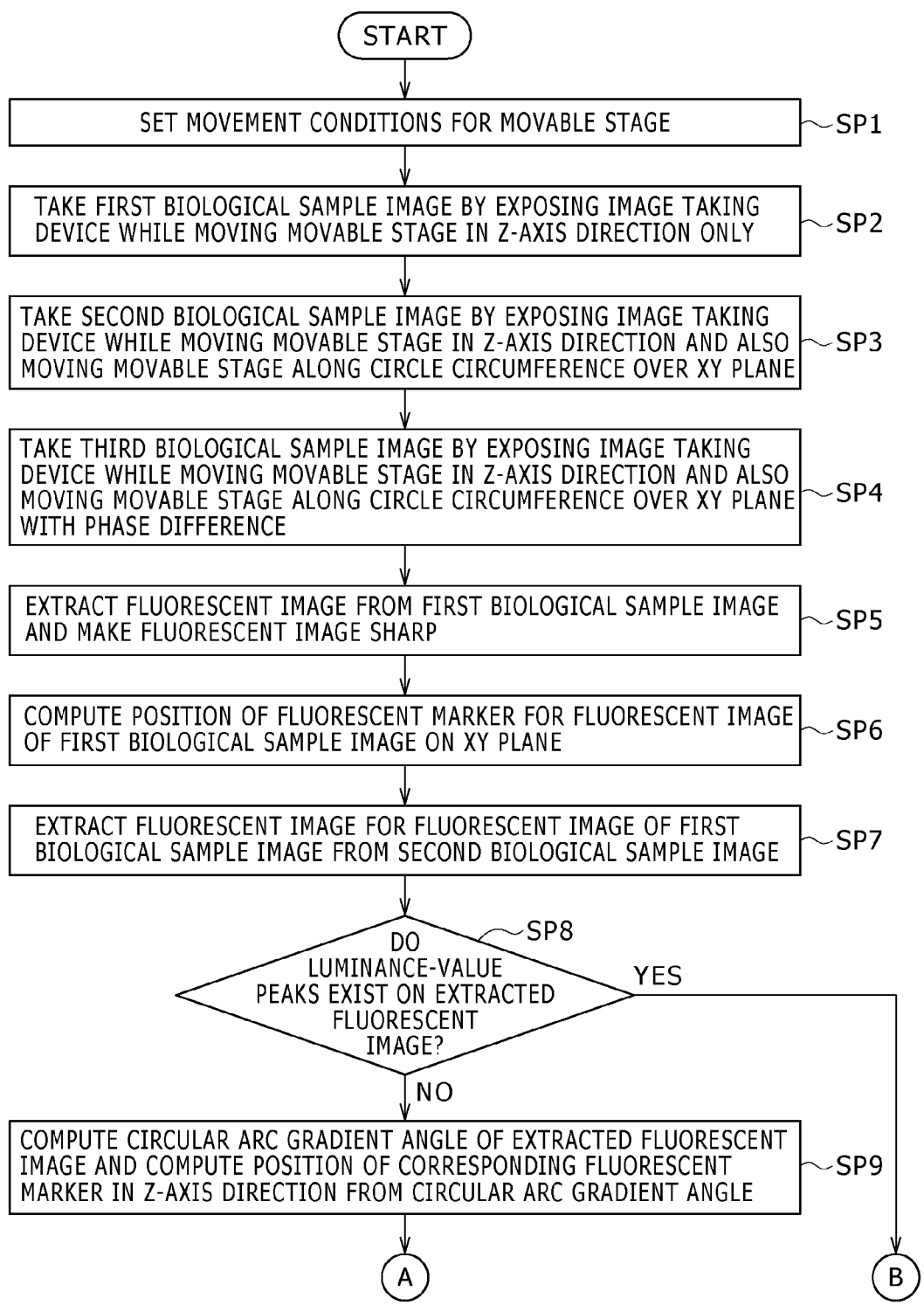
FIG. 12 shows an explanatory flowchart representing sample-image taking processing procedure (1)
Figure 13:
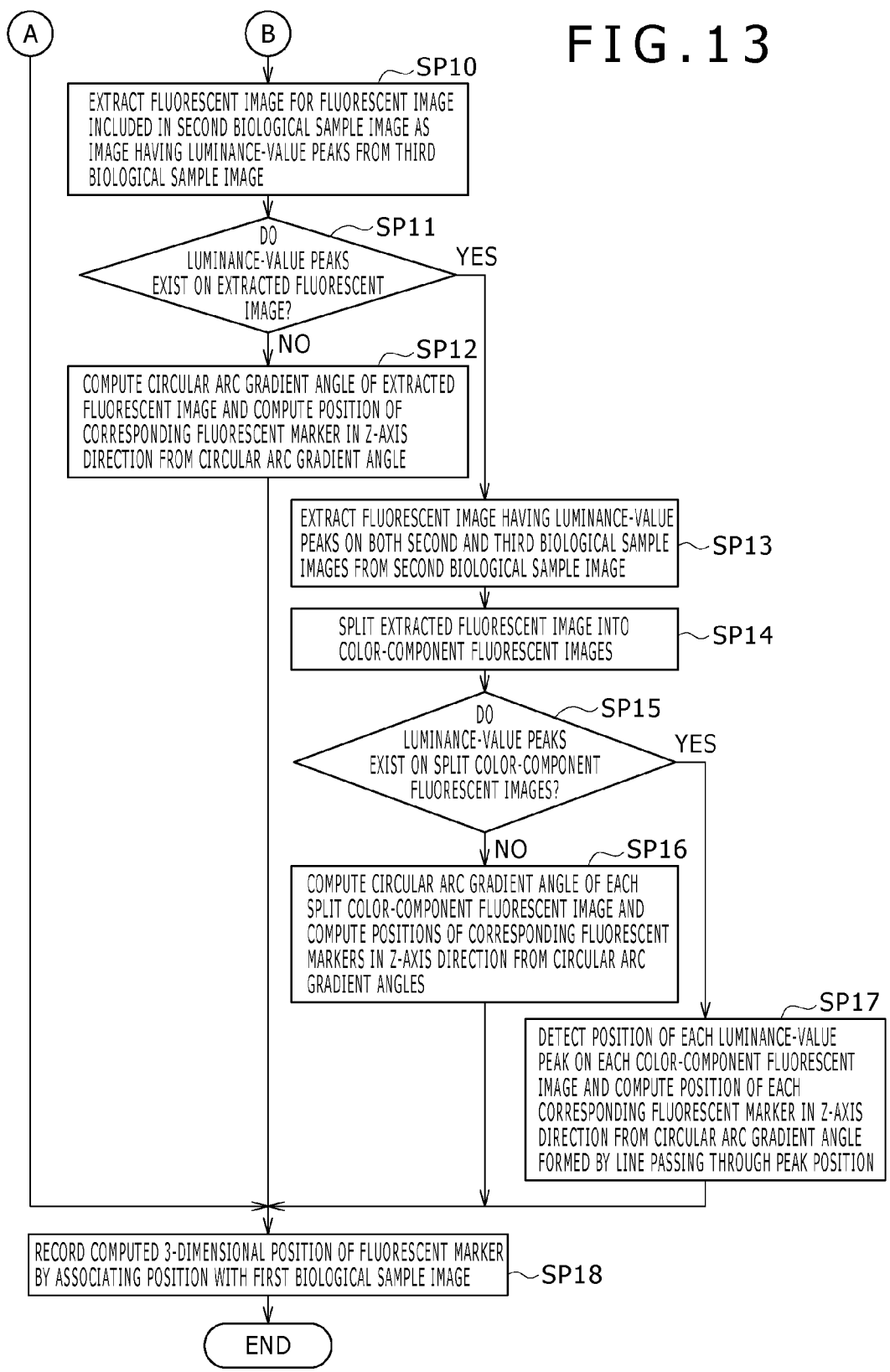
FIG. 13 shows an explanatory flowchart representing sample-image taking processing procedure (2)

Next, the procedure of the sample-image taking processing is explained by referring to flowcharts shown in FIGS. 12 and 13. In actuality, the CPU 21 carries out a start step of a routine RT1 in order to enter a step SP1 included in the flowchart shown in FIG. 12 as a step following the start step.

At the step SP1, the CPU 21 sets conditions for moving the movable stage 11 in first, second and third image taking operations. The conditions are conditions entered by the user through the operation input section 24 or conditions stored in advance in the ROM 22. Then, the processing procedure carried out by the CPU 21 goes on to the next step SP2.

At the step SP2, the CPU 21 moves the movable stage 11 at a constant speed only in the direction of the Z axis in a first image taking operation according to the conditions set at the step SP1. While moving the movable stage 11 in the first image taking operation, the CPU 21 concatenates images of members of a biological sample to each other in order to acquire a first biological sample image SIM1. The image of a member of a biological sample is an image taken by exposing the image taking device 15 to the member. Then, the processing procedure carried out by the CPU 21 goes on to the next step SP3.

At the step SP3, the CPU 21 moves the movable stage 11 at a constant speed along the circumference of a circle over the XY plane while moving the movable stage 11 at a constant speed in the direction of the Z axis in a second image taking operation according to the conditions set at the step SP1. While moving the movable stage 11 in the second image taking operation, the CPU 21 concatenates images of members of the biological sample to each other in order to acquire a second biological sample image SIM2. The image of a member of a biological sample is an image taken by exposing the image taking device 15 to the member. Then, the processing procedure carried out by the CPU 21 goes on to the next step SP4.

At the step SP4, the CPU 21 moves the movable stage 11 at a constant speed along the circumference of a circle over the XY plane while moving the movable stage 11 at a constant speed in the direction of the Z axis in a third image taking operation according to the conditions set at the step SP1. The CPU 21 moves the movable stage 11 along the circumference of a circle over the XY plane from a start point which has a phase difference of 90 degrees from the start point of the second image taking operation. While moving the movable stage 11 in the third image taking operation, the CPU 21 concatenates images of members of the biological sample to each other in order to acquire a third biological sample image SIM3. The image of a member of a biological sample is an image taken by exposing the image taking device 15 to the member. Then, the processing procedure carried out by the CPU 21 goes on to the next step SP5.

At the step SP5, the CPU 21 extracts a fluorescent image EP1 from the first biological sample image SIM1 and make the fluorescent image EP1 sharp by making use of the point spread function for the fluorescent image EP1. Then, the processing procedure carried out by the CPU 21 goes on to the next step SP6.

At the step SP6, the CPU 21 detects the center position Op of the fluorescent image EP1 extracted from the first biological sample image SIM1 and, on the basis of the center position Op, the CPU 21 computes the position (x, y) of the fluorescent marker EM corresponding to the fluorescent image EP1 on the XY plane. Then, the processing procedure carried out by the CPU 21 goes on to the next step SP7.

At the step SP7, the CPU 21 extracts the fluorescent image EP2 corresponding to the fluorescent image EP1, which has been extracted from the first biological sample image SIM1, from the second biological sample image SIM2. Then, the processing procedure carried out by the CPU 21 goes on to the next step SP8.

At the step SP8, the CPU 21 produces a result of determination as to whether or not a plurality of luminance-value peaks exist on the fluorescent image EP2 extracted from the second biological sample image SIM2. If the result of the determination is a negation indicating that only one peak of luminance values exists on the fluorescent image EP2, that is, if the result of the determination indicates that the fluorescent image EP2 is the image of one fluorescent marker EM, the processing procedure carried out by the CPU 21 carried out by the CPU 21 goes on to a step SP9.

At the step SP9, the CPU 21 computes the circular-arc gradient angle θ of the extracted fluorescent image EP2 which has only one peak of luminance values. In addition, on the basis of the circular-arc gradient angle θ, the CPU 21 also computes the position (z) of the fluorescent marker EM corresponding to the fluorescent image EP2 in the direction of the Z axis. Then, the processing procedure carried out by the CPU 21 goes on to the next step SP18.

If the determination result produced at the step SP8 is an affirmation indicating that a plurality of luminance-value peaks exist on the fluorescent image EP2, on the other hand, the processing procedure carried out by the CPU 21 goes on to a step SP10. At the step SP10, the CPU 21 extracts the fluorescent image EP3, which corresponds to the fluorescent image EP2 having a plurality of luminance-value peaks, from the third biological sample image SIM3. Then, the processing procedure carried out by the CPU 21 goes on to a step SP11.

At the step SP11, the CPU 21 produces a result of determination as to whether or not a plurality of luminance-value peaks exist on the fluorescent image EP3 extracted from the third biological sample image SIM3. If the result of the determination is a negation indicating that only one peak of luminance values exists on the fluorescent image EP3, that is, if the result of the determination indicates that the fluorescent image EP3 is the image of one fluorescent marker EM, the processing procedure carried out by the CPU 21 carried out by the CPU 21 goes on to a step SP12.

At the step SP12, the CPU 21 computes the circular-arc gradient angle θ of the extracted fluorescent image EP3 which has only one peak of luminance values. In addition, on the basis of the circular-arc gradient angle θ, the CPU 21 also computes the position (z) of the fluorescent marker EM corresponding to the fluorescent image EP3 in the direction of the Z axis. Then, the processing procedure carried out by the CPU 21 goes on to the next step SP18.

On the other hand, an affirmation determination result produced at the step SP11 is interpreted as a result which indicates that not only do a plurality of luminance-value peaks exist on the fluorescent image EP2 extracted from the second biological sample image SIM2, but a plurality of luminance-value peaks also exist on the fluorescent image EP3 extracted from the third biological sample image SIM3. That is to say, the affirmation determination result indicates that each of the fluorescent image EP2 and the fluorescent image EP3 is the image of two or more fluorescent markers EM which are located at about the same positions on the XY plane but separated away from each other in the direction of the Z axis.

If the determination result produced at the step SP11 is an affirmation, the processing procedure carried out by the CPU 21 carried out by the CPU 21 goes on to a step SP13. At the step SP13, the CPU 21 selects the fluorescent image EP2 or the fluorescent image EP3. In the case of this embodiment, the computation section 35 selects the fluorescent image EP2.

The fluorescent image EP2 having a plurality of luminance-value peaks has been extracted from the second biological sample image SIM2 whereas the fluorescent image EP3 having a plurality of luminance-value peaks has been extracted from the third biological sample image SIM3. Then, the processing procedure carried out by the CPU 21 goes on to a step SP14.

At the step SP14, the CPU 21 splits the fluorescent image EP2 extracted from the second biological sample image SIM2 into fluorescent image components for typical color components such as the red, blue and green colors. Then, the processing procedure carried out by the CPU 21 goes on to the next step SP15.

At the step SP15, the CPU 21 produces a result of determination as to whether or not a plurality of luminance-value peaks exist on each fluorescent image split from the fluorescent image EP2 for one of the typical color components. A negation result of the determination is interpreted as a result which indicates that two or more fluorescent markers EM are located at about the same positions on the XY plane but separated away from each other in the direction of the Z axis and emit light beams having different wavelengths representing colors different from each other. In this case, the processing procedure carried out by the CPU 21 goes on to a step SP16.

At the step SP16, the CPU 21 computes the circular-arc gradient angle θ of the split fluorescent image component of the fluorescent image EP2 for each color component and computes the position (z) of each of as many fluorescent markers EM as the peaks of luminance values in the direction of the Z axis on the basis of the circular-arc gradient angles θ. Then, the processing procedure carried out by the CPU 21 goes on to the next step SP18.

On the other hand, an affirmation determination result produced at the step SP15 is interpreted as a result which indicates that images of a plurality of fluorescent markers EM emitting light beams having about the same colors are superposed on the fluorescent image EP2. In this case, the processing procedure carried out by the CPU 21 goes on to a step SP17.

At the step SP17, the CPU 21 computes the position Bp of each of the luminance-value peaks on the fluorescent image EP2. Then, the CPU 21 computes an angle formed by a straight line L1 and the X axis, taking the angle as a circular-arc gradient angle θ. As explained earlier, the straight line L1 is a straight line connecting the found position Bp to the set center position Op of the circular arc of the fluorescent image EP2. Subsequently, the CPU 21 computes the position (z) of each of as many fluorescent markers EM as the peaks of luminance values in the direction of the Z axis on the basis of the circular-arc gradient angles θ. Then, the processing procedure carried out by the CPU 21 goes on to the next step SP18.

At the step SP18, the CPU 21 records the computed 3-dimensional position (x, y, z) of the fluorescent marker EM in the storage section 27 by associating the 3-dimensional position (x, y, z) with the fluorescent image EP1 on the first biological sample image SIM1. Then, the processing procedure carried out by the CPU 21 goes on to the next step to terminate the processing procedure.

1-5: Operations and Effects

While moving the movable stage 11 in the direction of the Z axis within a range including the biological sample SPL, the sample-image acquisition apparatus 1 having the configuration described above moves the movable stage 11 over the XY plane along the circumference of a specific circle and also along the circumference of another circle which has the same center point as the specific circle but has a start point with a phase difference of 90 degrees from the start point of the movement along the circumference of the specific circle. The sample-image acquisition apparatus 1 exposes the image taking device 15 to the biological sample SPL in order to take a second biological sample image SIM2 during the movement along the circumference of the specific circle and a third biological sample image SIM3 during the movement along the circumference of the other circle.

Thus, the sample-image acquisition apparatus 1 is capable of carrying out image taking operations without mutual superposition of images of two or more fluorescent markers EM close to each other on the XY plane and close to each other in the direction of the Z axis on at last either a fluorescent image EP2 extracted from the second biological sample image SIM2 or a fluorescent image EP3 extracted from the third biological sample image SIM3.

On the basis of the gradient of the fluorescent image EP2 with no mutually superposed images of two or more fluorescent markers EM or on the basis of the gradient of the fluorescent image EP3 with no mutually superposed images of two or more fluorescent markers EM, the sample-image acquisition apparatus 1 computes the position of each fluorescent marker EM in the direction of the Z axis. Thus, the sample-image acquisition apparatus 1 is capable of computing the position of each fluorescent marker EM in the direction of the Z axis with a high degree of precision.

In addition, as described above, in each of the second and third image taking operations, the sample-image acquisition apparatus 1 moves the movable stage 11 along the circumference of a circle on the XY plane. In the first image taking operation, on the other hand, the sample-image acquisition apparatus 1 moves the movable stage 11 in the direction of the Z axis within a range including the biological sample SPL along a straight line which passes through the center point of the circle. While moving the movable stage 11 in the direction of the Z axis in this way, the sample-image acquisition apparatus 1 exposes the image taking device 15 to the biological sample SPL in order to take a first biological sample image SIM1.

Thus, the sample-image acquisition apparatus 1 is capable of detecting the position of the fluorescent marker EM on the XY plane with a high degree of precision as well as capable of precisely computing the gradient of the circular arc of the fluorescent image EP2 extracted from the second biological sample image SIM2 and the gradient of the circular arc of the fluorescent image EP3 extracted from the third biological sample image SIM3. As a result, the sample-image acquisition apparatus 1 is capable of precisely computing the 3-dimensional position of the fluorescent marker EM serving as a label put on the biological sample SPL which functions as the target of the image taking operation.

In accordance with the configuration described above, while moving the movable stage 11 in the direction of the Z axis within a range including the biological sample SPL, the sample-image acquisition apparatus 1 moves the movable stage 11 over the XY plane along the circumference of a specific circle and also along the circumference of another circle which has the same center point as the specific circle but has a start point with a phase difference of 90 degrees from the start point of the movement along the circumference of the specific circle. While moving the movable stage 11 in this way, the sample-image acquisition apparatus 1 exposes the image taking device 15 to the biological sample SPL in order to take a second biological sample image SIM2 during the movement along the circumference of the specific circle and a third biological sample image SIM3 during the movement along the circumference of the other circle. Thus, the sample-image acquisition apparatus 1 is capable extracting a fluorescent image EP2 and a fluorescent image EP3 from the second biological sample image SIM2 and the third biological sample image SIM3 respectively without mutual superposition of images of two or more fluorescent markers EM on the fluorescent image EP2 and the fluorescent image EP3. As a result, the sample-image acquisition apparatus 1 is capable of precisely computing the 3-dimensional position of each of the fluorescent markers EM.

2: Other Embodiments

In accordance with the embodiment described above, the sample-image acquisition apparatus 1 moves the movable stage 11 over the XY plane along the circumference of a specific circle in order to take the second biological sample image SIM2 and also along the circumference of another circle, which has the same center point as the specific circle but has a start point with a phase difference of 90 degrees from the start point of the movement along the circumference of the specific circle, in order to take the third biological sample image SIM3. However, implementations of the present application are by no means limited to this embodiment. For example, the movement along the circumference of the other circle may have a start point with a phase difference of 30 or 45 degrees from the start point of the movement along the circumference of the specific circle.

In addition, in the embodiment described above, the 3-dimensional position of a fluorescent marker EM is computed by making use of the first biological sample image SIM1, the second biological sample image SIM2 and the third biological sample image SIM3 which are taken in three image taking operations respectively.

However, implementations of the present application are by no means limited to this embodiment. For example, the 3-dimensional position of a fluorescent marker EM may also be computed by making use of three or more biological-sample images taken in respectively three or more image taking operations which are carried out by moving the movable stage 11 over the XY plane from start points having phases different from each other.

In addition, the 3-dimensional position of a fluorescent marker EM may also be computed by making use of the second biological sample image SIM2 and the third biological sample image SIM3.

In this case, in the same way as the embodiment described above, while the movement control section 32 is moving the movable stage 11, the sample-image acquisition section 33 acquires the second biological sample image SIM2 and the third biological sample image SIM3 which are taken by exposing the image taking device 15 to the biological sample SPL. Then, the data recording section 34 generates second sample data for the second biological sample image SIM2 and third sample data for the third biological sample image SIM3, storing the second sample data and the third sample data in the storage section 27 by associating the second sample data and the third sample data with each other.

Later on, the computation section 35 reads out the second sample data for the second biological sample image SIM2 from the storage section 27 and reconstructs the second biological sample image SIM2 from the second sample data, extracting a bunch of pixels (each having a luminance) not smaller than a threshold value determined in advance from the second biological sample image SIM2 to be used as a fluorescent image EP2.

Figure 14:
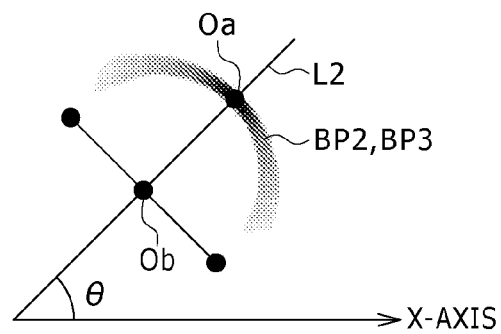
FIG. 14 is a rough diagram to be referred to in description of computation of a circular-arc gradient angle in another embodiment.

In the case of a fluorescent image EP2 having only one peak of luminance values, the computation section 35 treats the shape of the extracted fluorescent image EP2 as a circular arc as shown in FIG. 14. Then, the computation section 35 computes a circular-arc gradient angle θ formed by a straight line L2 in conjunction with the X axis. The straight line L2 is a straight line connecting the center point Oa of the circular arc to the center point Ob between the two ends of the circular arc. The center point Ob is a center point on the straight line connecting the two ends of the circular arc to each other. The center point Oa is the center point of the circular arc itself whereas the center point Ob is the center point of a circle drawn with the circumference thereof superposed on the circular arc.

Then, the computation section 35 multiplies the computed circular-arc gradient angle θ by (DZ/T1)/ω representing the movement distance of the focal-point plane FP per unit angle in order to find the position (z) of the fluorescent marker EM, which corresponds to the fluorescent image EP2, in the direction of the Z axis.

By adoption of typically the least square algorithm, the computation section 35 finds a circle extrapolating the extracted fluorescent image EP2 and, on the basis of a positional relation between the center point of the found circle and the initial position (X0, Y0) of the movable stage 11 on the XY plane, the computation section 35 computes the position (x, y) of the fluorescent marker EM, which is associated with the fluorescent image EP2, on the XY plane.

As described above, for every fluorescent image EP2 having only one peak of luminance values, the computation section 35 computes the 3-dimensional position (X, Y, Z) of the fluorescent marker EM associated with the fluorescent image EP2.

If the fluorescent image EP2 has two or more peaks of luminance values, on the other hand, the computation section 35 determines that images of as many fluorescent marks EM as the peaks of luminance values are superposed on each other. In this case, the computation section 35 reads out the third sample data associated with the second sample data from the storage section 27 and reconstructs the third biological sample image SIM3 from the third sample data.

Then, the computation section 35 extracts a bunch of pixels (each having a luminance) not smaller than a threshold value determined in advance from the third biological sample image SIM3 to be used as a fluorescent image EP3.

For a fluorescent image EP2 extracted from the second biological sample image SIM2 as a fluorescent image EP2 having two or more peaks of luminance values, the computation section 35 extracts as many fluorescent images EP3 each associated with the fluorescent image EP2 as the peaks of luminance values from the extracted fluorescent images EP3.

The computation section 35 extracts a fluorescent image EP3 from the third biological sample image SIM3 by adoption of a typical extraction method explained as follows. First of all, the computation section 35 computes the coordinates of the center position of the fluorescent image EP2 which has two or more peaks of luminance values on the second biological sample image SIM2. Then, the computation section 35 determines a third biological sample image SIM3 at a position corresponding to the coordinates of the center position of the fluorescent image EP2 on the second biological sample image SIM2. Finally, the computation section 35 extracts a fluorescent image EP3, which has a center position coinciding with the center position of the third biological sample image SIM3, from the third biological sample image SIM3.

Much like a fluorescent image EP2 having one peak of luminance values as described above by referring to FIG. 14, the computation section 35 treats the shape of the extracted fluorescent image EP3 as a circular arc. Then, the computation section 35 computes a circular-arc gradient angle θ formed by a straight line L2 in conjunction with the X axis. As explained earlier, the straight line L2 is a straight line connecting the center point Oa of the circular arc to the center point Ob between the two ends of the circular arc. The center point Ob is a center point on the straight line connecting the two ends of the circular arc to each other. The center point Oa is the center point of the circular arc itself whereas the center point Ob is the center point of a circle drawn with the circumference thereof superposed on the circular arc.

Then, the computation section 35 multiplies the computed circular-arc gradient angle θ by (DZ/T1)/ω representing the movement distance of the focal-point plane FP per unit angle in order to find the position (z) of the fluorescent marker EM, which corresponds to the fluorescent image EP3, in the direction of the Z axis.

Subsequently, by adoption of typically the least square method, the computation section 35 computes a circle which approximates the extracted bunch of pixels. Then, on the basis of a positional relation between the center point of the found circle and the initial position (X0, Y0) of the movable stage 11 on the XY plane, the computation section 35 computes the position (x, y) of the fluorescent marker EM, which is associated with the fluorescent image EP3, on the XY plane.

As described above, for every fluorescent image EP3 extracted from the third biological sample image SIM3, the computation section 35 computes the 3-dimensional position (x, y, z) of the fluorescent marker EM associated with the fluorescent image EP3.

In addition, in the same way as a case in which the fluorescent image EP2 extracted from the second biological sample image SIM2 has two or more peaks of luminance values and the fluorescent image EP3 extracted from the third biological sample image SIM3 also has two or more peaks of luminance values, the computation section 35 computes the 3-dimensional position (x, y, z) of each of as many fluorescent marks EM as the peaks of luminance values.

As described above, the sample-image acquisition apparatus 1 computes the 3-dimensional position (x, y, z) of a fluorescent mark EM by making use of the second biological sample image SIM2 and the third biological sample image SIM3. By the way, by making use of the first biological sample image SIM1, the second biological sample image SIM2 and the third biological sample image SIM3, the sample-image acquisition apparatus 1 is capable of computing the 2-dimensional position (x, y) of a fluorescent mark EM on the XY plane with a higher degree of accuracy. Thus, by making use of the first biological sample image SIM1, the second biological sample image SIM2 and the third biological sample image SIM3, the sample-image acquisition apparatus 1 is capable of finding the 3-dimensional position (x, y, z) of a fluorescent mark EM with a higher degree of precision.

In accordance with the embodiment described above, the sample-image acquisition apparatus 1 moves the movable stage 11 in the direction of the Z axis in order to move the focal-point plane FP of the objective lens 12A within a range which includes the biological sample SPL. However, implementations of the present application are by no means limited to this embodiment. For example, it is also possible to provide a lens movement mechanism for moving the objective lens 12A in the direction of the Z axis. By moving the objective lens 12A in the direction of the Z axis, the focal-point plane FP of the objective lens 12A can be moved in the direction of the Z axis in a movement relative to the biological sample SPL.

In addition, in accordance with the embodiment described above, the sample-image acquisition apparatus 1 moves the movable stage 11 over the XY plane in order to move the focal-point plane FP of the objective lens 12A over the XY plane. However, implementations of the present application are by no means limited to this embodiment. For example, it is also possible to provide another stage for moving the image taking device 15 over the XY plane. In this configuration, the other stage is driven in order to move the image taking device 15 over the XY plane.

Figure 15:
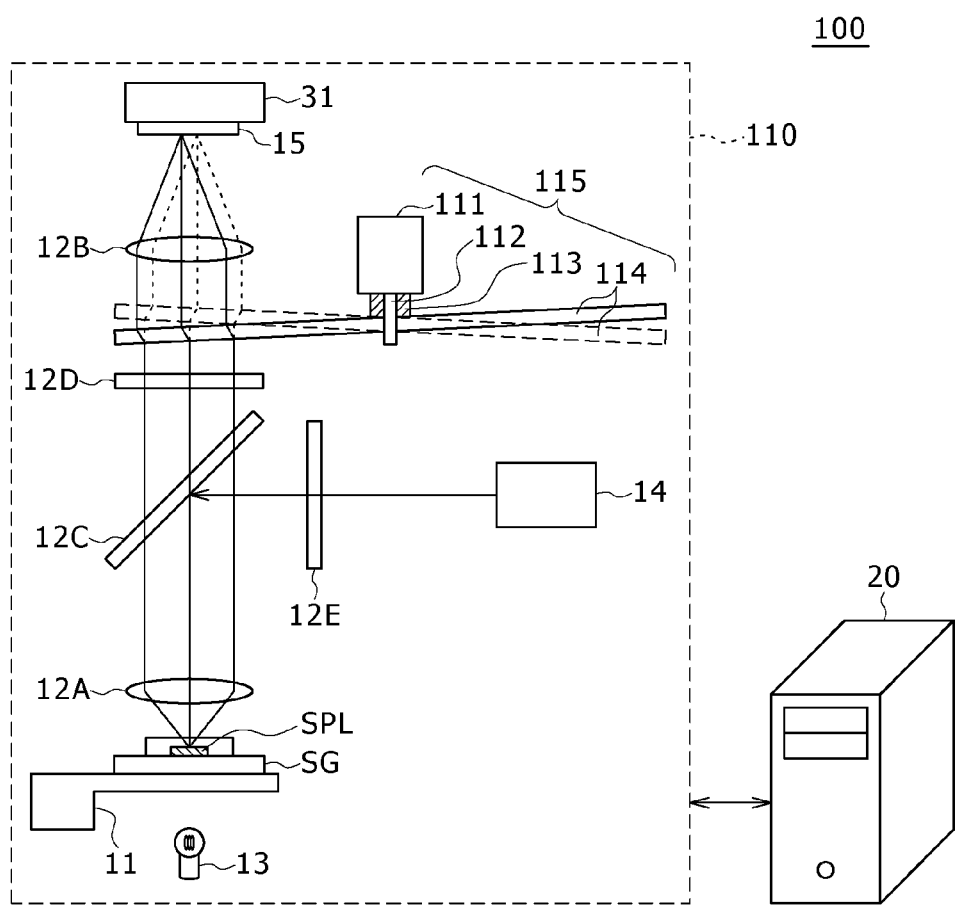
FIG. 15 is a rough diagram showing the configuration of a sample-image acquisition apparatus according to the other embodiment.

On top of that, in accordance with the embodiment described above, while moving the movable stage 11 in the direction of the Z axis, the sample-image acquisition apparatus 1 moves the movable stage 11 over the XY plane along the circumference of a circle in order to drive the movable stage 11 along the circumference of the circle on the XY plane without changing the orientation of a sample-member image created on the image taking device 15. However, implementations of the present application are by no means limited to this embodiment. For example, in a sample-image acquisition apparatus 100 like one shown in FIG. 15, a sample-member image created on the image taking device 15 can be moved along the circumference of a circle without changing the orientation of the image of the sample member.

As shown in the figure, the sample-image acquisition apparatus 100 is configured to include a microscope 110 and a data processing section 20. The microscope 110 employs an image-position movement section 115 which has a motor 111, a rotation axis 112, an inclination base 113 and a transparent plate 114.

On the basis of control executed by the data processing section 20, the motor 111 rotates the transparent plate 114 through the rotation axis 112.

The inclination base 113 is provided on the outer circumference of the rotation axis 112 and used for inclining the transparent plate 114 at a predetermined inclination angle relative to the rotation axis 112.

The transparent plate 114 is made from a transparent glass or plastic material having a refraction index different from that of the air, being formed into the shape of a circular plate having parallel upper and lower surfaces separated from each other by a distance determined in advance as the thickness of the transparent plate 114. The rotation axis 112 is pushed into the center point of the transparent plate 114, being fixed on the transparent plate 114.

The image-position movement section 115 is installed in the microscope 110 in such a way that the rotation axis 112 is oriented in a direction parallel to an optical axis between an image creation lens 12B and an emission filter 12D. In addition, the image-position movement section 115 is fixed at a position in the microscope 110 in such a way that a portion of the transparent plate 114 is positioned at a location between the image creation lens 12B and the emission filter 12D.

Thus, in the microscope 110, the motor 111 is rotated in order to rotate the transparent plate 114 in accordance with the rotation of the motor 111. With the transparent plate 114 rotating, the portion of the transparent plate 114 between the image creation lens 12B and the emission filter 12D moves up and down while an angle formed by the transparent plate 114 in conjunction with the optical axis between the image creation lens 12B and the emission filter 12D is varying.

In the microscope 110, the light source 14 radiates excitement light to the biological sample SPL. If the biological sample SPL has been stained with a fluorescent marker EM having a fluorescent staining color, the excitement light excites the fluorescent marker EM to emit light having the fluorescent staining color. The emitted light having the staining color propagates to the transparent plate 114 by way of the objective lens 12A, a dichroic mirror 12C and the emission filter 12D.

The emitted light having the fluorescent staining color arrives at the transparent plate 114, passing through the transparent plate 114 after being refracted at the lower and upper surfaces of the transparent plate 114. Then, the light is focused by the image creation lens 12B on the image taking device 15.

When the transparent plate 114 is rotating, the refraction direction of the staining-colored emitted light arriving at the transparent plate 114 is changed in accordance with the inclination angle of the transparent plate 114 between the image creation lens 12B and the emission filter 12D. Thus, the optical axis of the staining-colored emitted light passing through the transparent plate 114 is moved to draw a circle with the center point thereof coinciding with a position passed through by the optical axis of the staining-colored emitted light prior to the arrival of the staining-colored emitted light at the transparent plate 114.

In the microscope 110, the objective lens 12A enlarges an image created by the staining-colored emitted light and, after the transparent plate 114 has changed the position of the created image, the image creation lens 12B focuses the staining-colored emitted light on the image taking surface of the image taking device 15 in order to project the image on the image taking surface of the image taking device 15.

Every time a sample member pertaining to the biological sample SPL to serve as the image taking object is positioned in the image taking range AR, the movement control section 32 controls the microscope 110 to move the movable stage 11 only in the direction of the Z axis. While the movable stage 11 is being moved in this way, the sample-image acquisition section 33 exposes the image taking device 15 to the biological sample SPL in order to acquire images of sample members. Then, the sample-image acquisition section 33 concatenates the images of the sample members positioned in the image taking range AR in order to create a first biological sample image SIM1.

In addition, every time a sample member pertaining to the biological sample SPL to serve as the image taking object is positioned in the image taking range AR, the movement control section 32 controls the microscope 110 to move the movable stage 11 in the direction of the Z axis at a constant speed and rotate the transparent plate 114 along typically half the circumference of a circle. While the movable stage 11 is being moved in this way, the sample-image acquisition section 33 exposes the image taking device 15 to the biological sample SPL in order to acquire images of sample members. Then, the sample-image acquisition section 33 concatenates the images of the sample members positioned in the image taking range AR in order to create a second biological sample image SIM2.

On top of that, every time a sample member pertaining to the biological sample SPL to serve as the image taking object is positioned in the image taking range AR, the movement control section 32 controls the microscope 110 to move the movable stage 11 in the direction of the Z axis at a constant speed and rotate the transparent plate 114 along typically half the circumference of a circle. In this case, however, the microscope 110 rotates the transparent plate 114 from a start position shifted by an angle of 90 degrees from the start position of the rotation made to acquire the second biological sample image SIM2. While the movable stage 11 is being moved in this way, the sample-image acquisition section 33 exposes the image taking device 15 to the biological sample SPL in order to acquire images of sample members. Then, the sample-image acquisition section 33 concatenates the images of the sample members positioned in the image taking range AR in order to create a third biological sample image SIM3.

As described above, by rotating the transparent plate 114, the sample-image acquisition apparatus 100 is capable of moving an image created on the image taking device 15 along the circumference of a circle in order to acquire the second biological sample image SIM2 and the third biological sample image SIM3 without changing the orientation of the image.

It is to be noted that, instead of rotating the transparent plate 114 in order to move an image created on the image taking device 15 as an image of the biological sample SPL along the circumference of a circle without changing the orientation of the image, it is also possible to move the emission filter 12D so as to move an image created on the image taking device 15 along the circumference of a circle without changing the orientation of the image.

In addition, in accordance with the embodiment described above, the sample-image acquisition apparatus 1 computes the circular-arc gradient angle $\theta$ representing the gradient of a circular arc formed by the fluorescent image EP2 extracted from the second biological sample image SIM2 or the gradient of a circular arc formed by the fluorescent image EP3 extracted from the third biological sample image SIM3 and, on the basis of the circular-arc gradient angle $\theta$, the sample-image acquisition apparatus 1 computes the position (z) of the fluorescent marker EM, which corresponds to the fluorescent image EP2 or the fluorescent image EP3 respectively, in the direction of the Z axis. However, implementations of the present application are by no means limited to this embodiment.

For example, when the CPU 21 extracts a bunch of pixels (each having a luminance) higher than a threshold value determined in advance from the second biological sample image SIM2 or the third biological sample image SIM3 to be used as a fluorescent image EP2 or a fluorescent image EP3 respectively, in some cases, the fluorescent image EP2 or the fluorescent image EP3 may form an ellipse with a gradient according to the position (z) of the fluorescent marker EM, which corresponds to the fluorescent image EP2 or the fluorescent image EP3 respectively, in the direction of the Z axis. In such cases, the CPU 21 computes an angle formed by the long axis of the ellipse, which is formed by the fluorescent image EP2 or the fluorescent image EP3, in conjunction with the X axis. Then, the CPU 21 computes the position (z) of the fluorescent marker EM, which corresponds to the fluorescent image EP2 or the fluorescent image EP3 respectively, in the direction of the Z axis.

On top of that, in accordance with the embodiment described above, while moving the movable stage 11 in the direction of the Z axis, the sample-image acquisition apparatus 1 moves the movable stage 11 over the XY plane along the circumference of a circle in order to drive the movable stage 11 along the circumference of the circle on the XY plane without changing the orientation of a sample-member image created on the image taking device 15. Then, while moving the movable stage 11 in this way, the sample-image acquisition apparatus 1 exposes the image taking device 15 to the biological sample SPL in order to acquire a second biological sample image SIM2 or a third biological sample image SIM3. Subsequently, on the basis of a circular-arc gradient angle $\theta$ of the fluorescent image EP2 extracted from the second biological sample image SIM2 or a circular-arc gradient angle $\theta$ of the fluorescent image EP3 extracted from the third biological sample image SIM3, the sample-image acquisition apparatus 1 computes the position (z) of the fluorescent marker EM, which corresponds to the fluorescent image EP2 or the fluorescent image EP3 respectively, in the direction of the Z axis.

Figure 16A:
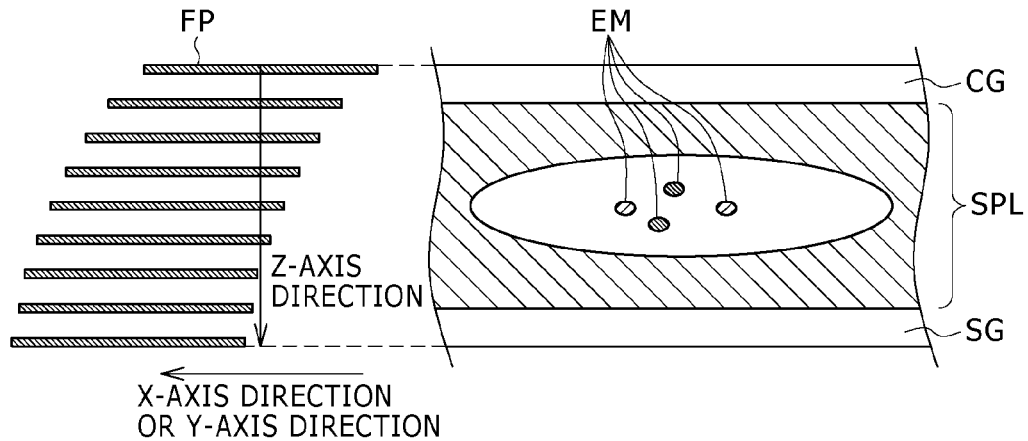
FIGS. 16A to 16C are a plurality of rough diagrams showing the movement of a focal-point plane and a fluorescent image with a movable stage moved in the direction of the Z axis as well as moved over the XY plane in the other embodiment.
Figure 16B:
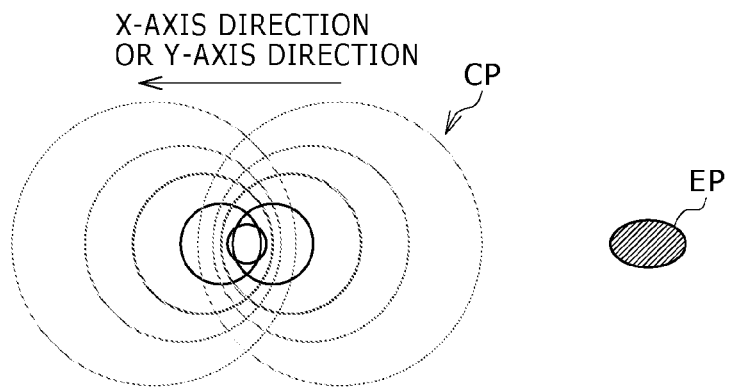
Figure 16C:
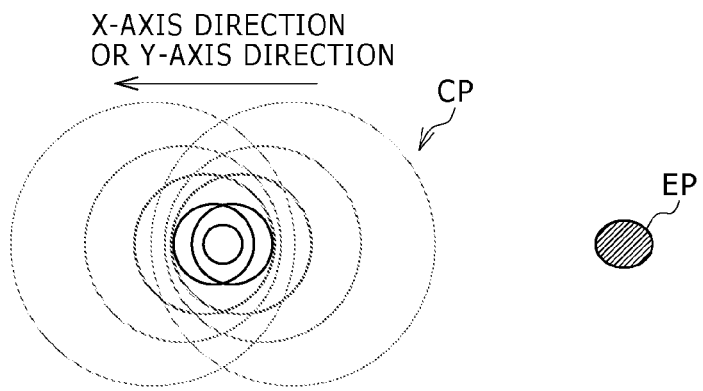

However, implementations of the present application are by no means limited to this embodiment. As shown in FIGS. 16A to 16C for example, while moving the movable stage 11 in the direction of the Z axis, the movement control section 32 may also accelerate or decelerate the movable stage 11 typically in the direction of the X axis so as to change the movement speed in the direction of the X axis. While the movement control section 32 is moving the movable stage 11 in this way, the sample-image acquisition section 33 concatenates sample-member images, which have been taken by exposing the image taking device 15 to sample members, in order to generate a biological-sample image referred to hereafter as a fourth biological-sample image.

As an alternative, while moving the movable stage 11 in the direction of the Z axis, the movement control section 32 may also accelerate or decelerate the movable stage 11 typically in the direction of the Y axis so as to change the movement speed in the direction of the Y axis. While the movement control section 32 is moving the movable stage 11 in this way, the sample-image acquisition section 33 concatenates sample-member images, which have been taken by exposing the image taking device 15 to sample members, in order to generate a biological-sample image referred to hereafter as a fifth biological-sample image.

Then, the CPU 21 extracts a bunch of pixels (each having a luminance) higher than a threshold value determined in advance from the fourth or fifth biological-sample image to be used as a fluorescent image EP shown in FIG. 16B or 16C. In accordance with the speed of the movement of the movable stage 11 over the XY surface, the ratio of the long axis of the fluorescent image EP to the short axis of the fluorescent image EP varies as shown in the figures.

The direction in which the movable stage 11 is moved over the XY plane in order to take the fourth biological-sample image is perpendicular to the direction in which the movable stage 11 is moved over the XY plane in order to take the fifth biological-sample image. Thus, even if two or more fluorescent markers EM are located at positions close to each other on the XY plane and at positions all but coinciding with each other in the direction of the Z axis, fluorescent images EP for the fluorescent markers EM are by no means superposed on each other on either the fourth biological-sample image or the fifth biological-sample image.

For the reason described above, the computation section 35 extracts a bunch of pixels (each having a luminance) higher than a threshold value determined in advance from each of the fourth and fifth biological-sample images to be used as a fluorescent image EP, selecting an fluorescent image EP having only one peak of luminance values from the extracted fluorescent images EP. Then, the computation section 35 computes the ratio of the long axis of the selected fluorescent image EP to the short axis of the selected fluorescent image EP. Subsequently, by making use of the computed ratio as a key, the computation section 35 searches a table prepared in advance for the position (z) of the fluorescent marker EM, which corresponds to the selected fluorescent image EP, in the direction of the Z axis. This table is a table associating the ratio of the long axis of a fluorescent image EP to the short axis of the fluorescent image EP with the position (z) of the fluorescent marker EM, which corresponds to the fluorescent image EP, in the direction of the Z axis.

Then, the computation section 35 computes the center position Op of the selected fluorescent image EP and takes the center position Op as the position (x, y) of the fluorescent marker EM, which corresponds to the selected fluorescent image EP, on the XY plane.

As described above, while moving the movable stage 11 in the direction of the Z axis, the sample-image acquisition apparatus 1 accelerates or decelerates the movable stage 11 typically in the direction of the X axis so as to change the movement speed in the direction of the X axis in an image taking operation which is carried out to generate a fourth biological-sample image. By the same token, while moving the movable stage 11 in the direction of the Z axis, the sample-image acquisition apparatus 1 accelerates or decelerates the movable stage 11 typically in the direction of the Y axis so as to change the movement speed in the direction of the Y axis in another image taking operation which is carried out to generate a fifth biological-sample image. Then, on the basis of the fourth and fifth biological-sample images, the sample-image acquisition apparatus 1 is capable of computing the position (x, y, z) of the fluorescent marker EM.

It is to be noted that, while being moved in the direction of the Z axis, the movable stage 11 is moved over the XY plane so that the ratio of the long axis of a fluorescent image EP to the short axis of the fluorescent image EP extracted from the fourth biological-sample image or the fifth biological-sample image has a typical value in the range 1.3 to 1.5.

In addition, in the embodiment described above, an objective lens 12A and an image creation lens 12B are provided. However, implementations of the present application are by no means limited to this embodiment. For example, it is also possible to provide a configuration in which only the objective lens 12A is provided. As an alternative, it is also possible to provide a configuration in which the magnification of each of the objective lens 12A and the image creation lens 12B is changed by making use of typically a revolver.

On top of that, in the embodiment described above, a biological sample of a living body is used as a sample. However, implementations of the present application are by no means limited to this embodiment. For example, a bead mounted on a glass base can also be used as a sample.

In addition, in the embodiment described above, sample data obtained by carrying out sample-image acquisition processing is reposited in the storage section 27 which is employed in the data processing section 20. However, the storage section 27 does not have to be provided in the data processing section 20. That is to say, the storage section 27 can also be provided externally to the data processing section 20. In addition, the communication medium for exchanging data with the storage section 27 is not limited to the bus 28. For example, it is possible to make use of a wire or radio communication medium such as a local area network, the Internet or digital satellite broadcasting.

On top of that, in the embodiment described above, the CPU 21 executes a sample-image acquisition program stored in advance in the ROM 22 in order to carry out the sample-image acquisition processing described above. However, implementations of the present application are by no means limited to this embodiment. For example, in order to carry out the sample-image acquisition processing described above, the CPU 21 may also execute a sample-image acquisition program which is installed in the storage section 27 from a recording medium or downloaded in the storage section 27 from a program provider connected to the Internet. In addition, in order to carry out the sample-image acquisition processing described above, the CPU 21 may also execute a sample-image acquisition program which is installed in the storage section 27 through any one of a variety of other routes.

In addition, in the embodiment described above, the image taking device 15, the movement control section 32 and the sample-image acquisition section 33 are provided to serve as an image taking device, a movement control section and a sample-image acquisition section respectively. However, implementations of the present application are by no means limited to this embodiment. For example, it is possible to provide a configuration employing an image taking device, a movement control section and a sample-image acquisition section which each have any one of a variety of configurations different from the image taking device 15, the movement control section 32 and the sample-image acquisition section 33 respectively.

The present application can be applied to bio industrial activities such as biological experiments, productions of medicines and observations of health progress made by patients.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A sample-image acquisition apparatus comprising:
   an image taking device on which an image of a sample is created after being enlarged by an objective lens;
   a movement control section configured to move a relative position, which is movable in a plane direction perpendicular to an optical-axis direction as a position relative between said image of said sample and said image taking device used for creating said image of said sample after being enlarged by said objective lens having a focal point movable within a range including said sample, in said plane direction changed for each position of said focal point in said optical-axis direction while moving said focal point in said optical-axis direction within said range; and
   a sample-image acquisition section configured to acquire a sample image by exposing said image taking device to said sample while said movement control section is moving said relative position in a circular arc at a constant speed in said plane direction and moving said focal point in said optical-axis direction such that a fluorescent marker of the sample is in focus for at least a portion of the exposure and subsequently blurred for another portion of the exposure.

2. The sample-image acquisition apparatus according to claim 1, wherein, while moving said focal point of said objective lens in said optical-axis direction within said range including said sample, said movement control section moves a relative position, which is movable in said plane direction as a position relative between a sample-member image created on said image taking device as an image of a member of said sample after being enlarged by said objective lens and said image taking device, along circumferences of circles having the same center point from start points different from each other.

3. The sample-image acquisition apparatus according to claim 2, wherein:
   said movement control section moves said focal point of said objective lens in said optical-axis direction within said range including said sample at said center point of said circle having a circumference, along which said movement control section moves said relative position in said plane direction; and while said movement control section is moving said focal point of said objective lens in said optical-axis direction, said sample-image acquisition section acquires an image of said sample by exposing said image taking device to said sample.

4. The sample-image acquisition apparatus according to claim 1, wherein, while moving said focal point of said objective lens in said optical-axis direction within said range including said sample, said movement control section moves a relative position, which is movable in said plane direction as a position relative between a sample-member image created on said image taking device as an image of a member of said sample after being enlarged by said objective lens and said image taking device, along straight lines in order to change said plane direction.

5. The sample-image acquisition apparatus according to claim 1, said sample-image acquisition apparatus further having a computation section configured to compute a position of said sample in said optical-axis direction on the basis of a movement locus traced by a sample-member image of said sample image on said image taking device.

6. A sample-image acquisition method comprising:
a movement control step of moving a relative position, which is movable in a plane direction perpendicular to an optical-axis direction as a position relative between an image of a sample and an image taking device used for creating said image of said sample after being enlarged by an objective lens having a focal point movable within a range including said sample, in said plane direction changed for each position of said focal point in said optical-axis direction while moving said focal point in said optical-axis direction within said range; and a sample-image acquisition step of acquiring a sample image by exposing said image taking device to said sample while said movement control step is being carried out to move said relative position in a circular arc at a constant speed in said plane direction and move said focal point in said optical-axis direction such that a fluorescent marker of the sample is in focus for at least a portion of the exposure and subsequently blurred for another portion of the exposure.

7. A non-transitory computer readable storage medium storing a sample-image acquisition program to be executed by a computer to perform:
a movement control step of moving a relative position, which is movable in a plane direction perpendicular to an optical-axis direction as a position relative between an image of a sample and an image taking device used for creating said image of said sample after being enlarged by an objective lens having a focal point movable within a range including said sample, in said plane direction changed for each position of said focal point in said optical-axis direction while moving said focal point in said optical-axis direction within said range; and a sample-image acquisition step of acquiring a sample image by exposing said image taking device to said sample while said movement control step is being carried out to move said relative position in a circular arc at a constant speed in said plane direction and move said focal point in said optical-axis direction such that a fluorescent marker of the sample is in focus for at least a portion of the exposure and subsequently blurred for another portion of the exposure.

8. The sample-image acquisition apparatus according to claim 1, wherein the sample image indicates a depth of the fluorescent marker in said sample.

9. The sample-image acquisition apparatus according to claim 1, wherein while said image taking device is exposed to said sample, said movement control section moves the focal point in the optical-axis direction from a top of the sample to a bottom of the sample.

10. The sample-image acquisition apparatus according to claim 1, wherein the movement control section moves at least one of the focal point and the relative position such that the fluorescent marker associated with the sample is (i) blurred during a first portion of the exposure, (ii) in focus during a second portion of the exposure, and (iii) blurred during a third portion of the exposure, the first portion occurring before the second portion and the third portion and the second portion occurring before the third portion.

11. The sample-image acquisition apparatus according to claim 1, wherein the movement control section moves at least one of the focal point and the relative position to distinguish a three-dimensional location of the fluorescent marker from a three-dimensional location of an adjacent fluorescent marker.

12. The sample-image acquisition apparatus according to claim 1,
wherein said movement control section is configured to move said relative position in the circular arc in said plane direction according to equation 1 and equation 2,
wherein equation 1 is equal to $X=X0+L0(\sin(\omega T))$ and equation 2 is to $Y=Y0+L0(\cos(\omega T))$, and
wherein X is a lateral position in said plane direction, Y is a longitudinal position in said plane direction, X0 and Y0 correspond to a reference position within said plane direction, L0 is a radius of the circular arc, and T is a movement time.

13. The sample-image acquisition apparatus according to claim 1,
wherein said movement control section is configured to move said relative position in the circular arc in said plane direction according to equation 1 and equation 2,
wherein equation 1 is equal to $X=X0+L0(\sin(\omega T+90°))$ and equation 2 is to $Y=Y0+L0(\cos(\omega T+90°))$, and
wherein X is a lateral position in said plane direction, Y is a longitudinal position in said plane direction, X0 and Y0 correspond to a reference position within said plane direction, L0 is a radius of the circular arc, and T is a movement time.

* * * * *